United States Patent [19]

Vigarié

[11] Patent Number: 4,543,645
[45] Date of Patent: Sep. 24, 1985

[54] POINT MEMORY GRAPHIC TERMINAL

[75] Inventor: Jean-Pierre Vigarié, 32 Rue des Tilleuls, 35510 Cesson, France

[73] Assignees: Jean-Pierre Vigarié, Cesson; Etablissement Public de Diffusion dit "TELEDIFFUSION DE FRANCE", Montrouge, both of France

[21] Appl. No.: 547,778

[22] Filed: Nov. 1, 1983

[30] Foreign Application Priority Data

Nov. 4, 1982 [FR] France .............................. 82 18492

[51] Int. Cl.$^4$ .............................................. G06F 3/14
[52] U.S. Cl. ...................................... 364/900; 340/703
[58] Field of Search ... 364/200 MS File, 900 MS File; 340/703

[56] References Cited

U.S. PATENT DOCUMENTS 3,999,308  12/1976  Peters ........................................ 35/12
4,225,861  9/1980  Langdon, Jr. et al. ............. 340/703

FOREIGN PATENT DOCUMENTS 2466061  3/1981  France .

Primary Examiner—Raulfe B. Zache
Attorney, Agent, or Firm—Pearne, Gordon, Sessions, McCoy, Granger & Tilberry

[57] ABSTRACT

An image memory graphic terminal comprising an image memory constituted by N memory planes, each plane incorporating a matrix system of memory points, a sequencer, a graphic display processor, a video signal generator, a video display receiver, a management microcomputer.

According to the invention, the terminal also comprises a system for writing or recording in the image memory image texture signals, said system comprising (A) a circuit for processing the access cycle to the image memory, said circuit incorporating:
 (A$_1$) a circuit for the transmission, with a time lag, of the signals for controlling the access cycle to the memory,
 (A$_2$) a shaping circuit (42),
(B) a circuit for the determination of the word to be written into the memory, incorporating:
 (B$_1$) an operation parametrization circuit,
 (B$_2$) a computing circuit being able to: . calculate two coordinates $\alpha^*$ and $\beta^*$ from addresses x, y and signals $\Delta X$, $\Delta Y$, $\Delta H$, $\Delta V$, off$_x$, off$_y$
 (B$_3$) a pattern memory circuit constituted by memories containing information defining different types of pattern and, for each type, several patterns,
 (B$_4$) a configuration selection circuit.

3 Claims, 31 Drawing Figures $\Delta X=8$   $\Delta Y=8$   $\Delta H=0$   $\Delta V=0$ $\Delta X=32$   $\Delta Y=8$   $\Delta H=8$   $\Delta V=0$ $\Delta X=8$   $\Delta Y=8$   $\Delta H=0$   $\Delta V=2$

POINT MEMORY GRAPHIC TERMINAL

BACKGROUND OF THE INVENTION

The present invention relates to a point memory graphic terminal provided with a system for recording or writing into an image memory image texture signals.

A point memory graphic terminal is shown in very general form in FIG. 1. It comprises a management microcomputer 10, a contro circuit 12, an image memory 14, a video signal generator 16 connected to the memory and finally a video display receiver 18. Circuit 12 comprises a memory address generator (GAM) and a plane selector (SP). Memory 14 is constituted by N memory planes.

FIG. 2 defines the structure of these elements and the various connections interconnecting them. It is also possible to see in a more detailed manner therein, the image memory 14 with its N memory planes $14_1 \ldots 14_N$ (N being an integer at least equal to 1), each plane having a matrix system of points able to in each case store one bit. Each point is defined by an address. The N bits of N points with the same address in the different planes define a word of N bits, designated hereinafter by V. Memory 14 has an addressing input 14Ad common to the N planes and a control input 14C, which is also common to all the planes. It also has N validation inputs $14V_1 \ldots 14V_N$ and N binary outputs $14S_1 \ldots 14S_N$.

The control circuit comprises a sequencer 20 and a graphic display processor 22. The sequencer has a clock output $20s_1$ and control outputs $20s_2$. The graphic display processor has an input 22e, a first group of outputs $22s_1$ associated with outputs $20s_2$ of the sequencer, said outputs supplying control signals SC defining an access cycle to the memory, a second group of outputs $22s_2$ supplying address signals SAd, a third group of outputs $22s_3$ supplying synchronization and clock signals SH for the generator 16. The control signals SC are applied by a first bus to the control input 14C of memory 14 and address signals SAd by a second bus to the addressing input 14Ad.

The control circuit 12 also has a circuit 24, which is connected to N gates $26_1 \ldots 26_N$, whereof the outputs are connected to the validation inputs $14V_1 \ldots 14V_N$ of the memory. Circuit 24 controls the opening of gates $26_1 \ldots 26_N$ for validating the memory planes in accordance with the signal supplied by output $22s_1$ of circuit 22.

All the means of circuit 12 fulfil the function of memory address generation (GAM) and plane selection (SP).

The video signal generator 16 has N binary inputs $16e_1 \ldots 16e_N$ connected to N binary outputs of the image memory 14, a synchronization input 16E connected to the third group of outputs $22s_3$ of the graphic display processor 22 and a clock input 16H connected to the clock output $20s_1$ of sequencer 20. Generator 16 also has an output 16s supplying video signals (R, V, B) and synchronization signals (S).

A graphic terminal of this type serves to produce images from the information which it receives or processes. These images are designed and stored point by point in memory 14, which for this reason is called an "image memory". The management of such a graphic terminal is ensured by microcomputer 10, which converses with the outside (in practice with a host computer, another terminal, a keyboard, a graphic board, etc) and transforms requests for creating images into appropriate signals, which are supplied to its output $10s_1$ and addressed to the control circuit 12. The latter is designed in such a way that the values corresponding to each of the points constituting the graphic symbol to be displayed are written into the image memory. These values translate the appearance of each of the points in the way in which they are to appear on the screen. It can be a question of the luminance, primary colours or any other magnitude making it possible to restore one or other of these characteristics.

Two operations must be simultaneously performed for recording or writing a graphic symbol into the image memory, namely a definition of the skeleton of the graphic symbol, which is obtained by the definition of a group of points and an evaluation, for each of these points of the skeleton, of the value V which is to be represented in the image memory. The first operation is carried out by the memory address generator GAM, which generates addresses, or in other words coordinates of points, whilst the second operation is performed by the plane selector SP. The value V is one of the $2^N$ possible values and is translated by a word of N bits formed by bits equal to 0 or to 1. Each "1" with a given rank in the word is stored in the memory plane of the same rank at the address defined by the address generator. Thus, when circuit 12 consists of a graphic symbol, it simultaneously determines the coordinates x, y of the points forming this graphic symbol and the planes of the memory which it has to validate.

The function of the video generator 16 is to convert the signal read into the image memory into a signal able to control a display means, such as a video receiver. Typically, this signal is of the type encountered in television. It should be noted, that in reading, the video generator 16 has permanent access to the image memory.

The assembly formed by circuit 12, image memory 14 and generator 16 constitutes what is called an automatic visual display means. In a first generation, the design of such means essentially was based on the software used for defining the operation necessary for the display of characters, points, vectors, circular arcs, spots, etc. The disadvantage of such equipment is that they lead to a relatively long performance time. Therefore, certain functions particularly connected to the image memory and the video generator, have undergone certain improvements of an equipment nature in order to speed up the processing of the trace, plot or outline generator.

A second generation of display means appeared with the development of specialized integrated circuits relating to the management of point image memories (e.g. EFCIS 9365 or NEC 7220 circuits). In general, these circuits combine the functions of the overall management of the memory, both for the writing trace generator and for the reading video generator in the management of the actual memory (dynamic memory refreshing). They also ensure the functions of the structuring of the video signal (synchronization, clearing period) and certain trace functions (characters, segments, circular arcs, etc).

However, such circuits only function with a single memory plane. They are characterized mainly by a high speed of effecting the traces, but have a less fine control of the graphic symbols obtained.

Among the terminals of the first generation, reference can be made to the terminal especially designed for telerecording or alphageometric videographics, forming the object of French patent application No. 2,465,281 entitled "Device for the digital transmission and display of graphic symbols and/or characters on a screen". In such a terminal, the writing accesses of the image memory are under the control of the software, which integrally determines each point to be written and its value. The aforementioned GAM and SP functions are then obtained by instruction programmes. With such a terminal, it is possible to perform a so-called zone filling process, in order to cover part of the image by hatching, or to give it a particular shade or tint.

The various functions fulfilled by these equipments permit a considerable flexibility with regards to the formation of the images but, as they require a considerable processing time, these functions are in practice limited to simple processing operations, i.e. uniform colour filling, elementary hatching, etc.

In the terminals of the second generation, the software plays a smaller part than the hardware. The integrated circuits used carry out a high level management of the image memory. For example, the graphic display processor EF 9365 developed by EFCIS directly generates at high speed in the image memory characters or vectors. However, in this case, the appearance of the displayed points is not as finely controlled, because this type of circuit is unaware of the notion of memory planes.

Thus, the known terminals are unable to reconcile the speed of obtaining an image and the fine detailed resolution thereof. The solutions using circuits specialized in the management of image memories favour the first parameter, but penalize the second. Conversely, the necessary image resolution can be obtained by software, but then the processing time becomes too long.

SUMMARY OF THE INVENTION

The object of the present invention is to reconcile the flexibility of solutions based on the software and the speed of specialized hardware, whilst seeking to obtain a relative performance simplicity.

To this end, the invention provides for the insertion into a terminal of the type described hereinbefore, of a system for writing or recording in an image memory image texture signals which, as is shown in FIG. 3, where it carries the reference numeral 30, is inserted between on the one hand the sequencer group 20 and the graphic display processor 22 and on the other hand memory 14. Such a system is designed so that it is possible to record in the image memory at a speed compatible with the use of the specialized circuits Apart from the recording of a constant value, used in the case of simple graphic symbols based on lines or characters, the system according to the invention makes it possible to modify this value within certain zones of the image, in order that special textures or configurations can be obtained. Thus, a terminal equipped with the system according to the invention has two operating modes, namely a "normal" mode, which is that where the value V allocated to different points is constant, programmable and independent of the position of the points, and a "pattern/motif" mode, which is that where the value V allocated to a point is a function of the position of the point in the pattern which it is wished to obtain. The first mode is used in the case of traces of vectors, the display of characters or uniform background areas and the second in the case of traces of areas with a non-uniform background (e.g. in the case of hatching).

The system according to the invention is based on the textures obtained by the repetition of the same pattern. In addition, the access feed to the image memory is independent of the pattern used, the desired texture or the number of planes of the image memory.

The system according to the invention requires an operation of the image memory and the memory address generator, such that simultaneous access is obtained to all the bits of the same address in the N planes by a memory writing cycle. Thus, it is possible to control the visual rendering of each point of the image memory, the specialized circuit serving as a memory address generator being used at its maximum capacity. This point access makes it possible, by only processing in the system according to the invention the points within an area, to automatically solve the problems of cutting or dicing the texture along the contour of this area.

The results which can be obtained according to the invention are particularly characteristic in the case where it is necessary to fill the image portions by different textures. If the terminal uses a memory with a single plane able to store an image at two luminance levels, according to the invention it is possible to simulate several luminance levels by the use of different patterns with a variable point density. In the case of a terminal using a memory with three planes and colour display means, this technique can be generalized in order to artificially increase the range of shades. Finally, by acting on the different parameters defining the repetition of the motif, it is possible to produce hatching in different directions, with different widths and possibly different colours. Finally, it is possible to bring about the appearance of a uniform background on which a particular graphic symbol is repeated.

Before describing the essential means of the invention and special embodiments thereof, certain considerations in connection with the manner of defining an image texture will be developed.

Hereinafter, the term "pattern" is used to define a matrix of points of the image memory with L lines and E columns. This pattern is inscribed in a mesh, which is a rectangle of size $\Delta x$ and $\Delta y$. Such a mesh can be repeated according to the principle illustrated in FIGS. 4a and 4b. In the horizontal direction, the mesh is repeated with the period $\Delta x$ and is vertically displaced by $\Delta V$ (FIG. 4a) in the vertical direction, the mesh is repeated with period $\Delta y$, whilst being horizontally displaced by $\Delta H$ (FIG. 4b). It is hereinafter assumed that the vertical and horizontal displacements are mutually exclusive, i.e. if $\Delta H$ is not zero, then $\Delta V$ is zero (FIG. 4b) and vice versa (FIG. 4a). Finally, it is necessary to define an origin of the mesh, which is the point corresponding to the lower left-hand corner of the initial elementary pattern and its coordinates are designated off$_x$ and off$_y$.

Thus, a mesh is formed by two parts, namely the motif part containing the different points distributed in the dotted line rectangles of FIGS. 4a and 4b and the mesh background part consisting of the complementary areas. The points forming the mesh background can correspond to a selected constant value, which then produces a uniform background, or can correspond to the value which would characterize the appearance of the screen before introducing the pattern, the mesh background then being transparent.

This is shown in FIG. 5, where the left-hand part shows an appearance of the screen corresponding to an image, prior to the incorporation of an image texture, whilst the right-hand part shows the appearance of said screen for a uniform background mesh (at the top) and a transparent background mesh (at the bottom).

An image texture corresponding to such a pattern repetition is written into the image memory in accordance with the following process. In order to define the words to be written at an address (x, y), it is firstly necessary to calculate the coordinates ($\alpha,\beta$) of the point with respect to the mesh in which it is located. This is shown in FIGS. 4a and 4b, where a point $W_i$ has coordinates x, y on considering the memory plane and coordinates $\alpha,\beta$ on referring to the mesh to which it belongs.

Therefore, it is firstly necessary to calculate two coordinates $\alpha^*$ and $\beta^*$ defined by the relations:

$$\alpha^* = (x + \text{off}_x) - \frac{(y + \text{off}_y)}{\Delta y} \cdot \Delta H \quad (1)$$

$$\beta^* = (y + \text{off}_y) - \frac{(x + \text{off}_x)}{\Delta x} \cdot \Delta V \quad (1')$$

It is pointed out that if $\Delta H \neq 0$, $\Delta V$ must be zero and vice versa. These quantities being obtained, it is established whether $\alpha^*$ is positive or negative and in the affirmative the sought coordinate $\alpha$ is taken as equal to:

$\alpha^*$ modulo $\Delta X$ (2)

In the negative, we assume: $\alpha = [\Delta X - (/\alpha^*)$ modulo $\Delta X]$ modulo $\Delta X$ (3)

in which $|\alpha^*|$ designates the absolute value of $\alpha$.

In the same way, it is established whether $\beta^*$ is positive or zero. In the affirmative, we take:

$\beta = \beta^*$ modulo $\Delta Y$ (2')

and in the negative, we take:

$\beta = [\Delta Y - (|\beta^*|$ modulo $\Delta Y)]$ modulo $\Delta Y$ (3')

Knowing $\alpha$ and $\beta$, it is then necessary to establish whether the point is in the pattern part or in the background part of the pattern. This means examining whether $\alpha$ is less than E and simultaneously if $\beta$ is less than L. If this condition is satisfied (condition which is designated hereinafter by "DANS"), the memory point of coordinates (x, y) corresponds to a point in the pattern. A word defined by the pattern corresponds thereto in the image memory. If this condition is not satisfied, the memory point (x, y) corresponds to a point located outside the pattern and the word corresponding thereto remains unchanged in the case of a transparent mesh background or assumes an arbitrary value in the case of a uniform mesh background.

FIGS. 6, 7 and 8 illustrate certain textures which can be obtained with different combinations of values $\Delta X$, $\Delta Y$, $\Delta H$ and $\Delta V$. For each combination, the form and repetition mode of the mesh are indicated by four white rectangles (in practice it is obvious that the repetition of the elementary pattern extends over more than four meshes). The form or shape of a mesh is defined by $\Delta X$ and $\Delta Y$ (cf FIGS. 4a, 4b) and the displacement of a mesh during its repetition is defined by $\Delta H$ and $\Delta V$. For example, for the first texture, which is illustrated in FIG. 6, we obtain $\Delta X = 8$, $\Delta Y = 8$, $\Delta H = 0$, $\Delta V = 0$. This means that the elementary mesh is a square ($\Delta X = \Delta Y$) and that this mesh is reproduced without either horizontal or vertical displacement ($\Delta H = \Delta V = 0$). Hence, the four white squares. For FIG. 7, we then obtain $\Delta X = 32$, $\Delta Y = 8$, $\Delta H = 8$ and $\Delta V = 0$. The elementary mesh is then a horizontally elongated rectangle, which is reproduced with a horizontal displacement, but no vertical displacement. Finally, for FIG. 8, we then obtain $\Delta X = 8$ $\Delta Y = 8$, $\Delta H = 0$, $\Delta V = 2$. The elementary mesh is once again a square, but is reproduced with a vertical displacement.

For each of these three combinations, three different patterns are illustrated and are defined by three pairs of values E and L. The appearance of the pattern is defined at the top of each texture by a square simulating the mesh, whereof part which simulates the pattern is in dotted line form. For the three drawings, we find at the left a pattern such that $E = \Delta A$ and $L = \Delta Y/2$, which is symbolized by a square, whereof the lower half is in dotted line form, in the centre a pattern such that $E = \Delta X/2$ and $L = \Delta Y$, symbolized by a square whose left-hand half is in dotted line form and finally, to the right, a pattern in which we have $E = \Delta X/2$ and $L = \Delta Y/2$, which is symbolized by a small dotted line square located in the lower left-hand corner.

On repeating these three elementary mesh types in accordance with the three indicated types, we obtained the nine represented textures.

In exemplified form, FIG. 9 shows a combination of textures which can be obtained by the system according to the invention. Naturally, all these examples are in no way limitative and merely serve to illustrate the principle of generating a texture, on which the present invention is based.

These considerations having been illustrated and returning to FIG. 3 showing the general structure of the terminal according to the invention, system 30 which characterizes the invention must essentially contain two types of circuits:

(A)—firstly a circuit for processing the access cycle to the memory, whose function is to transmit thereto appropriate addressing signals and control signals, (b)—a circuit for determining the word to be written into the image memory for each point of the image to be displayed, said word depending on the pattern chosen and the position of the considered point in this pattern.

More specifically, according to the invention the circuit (A) for processing the access cycle to the image memory contains:

(A₁)—a first circuit for the transmission with a time lag of the control and addressing signals from circuits 20 and 22, (A₂)—a second shaping circuit which, on the basis of the address of one point, is able to restore the coordinate x, y of this point.

The circuit B) for determining the word to be written in the memory contains four signals:

(B₁)—an operation parametrization circuit, whose function is to supply quantities $\Delta X$, $\Delta Y$, $\Delta H$, $\Delta V$, off$_x$, off$_y$, E, L, defining a particular texture and certain signals defining an operating mode, (B₂)—a circuit for calculating the coordinates $\alpha$ and $\beta$ corresponding to the point of the coordinates x and y and for determining the position of said point relative to the elementary pattern, (B3) a pattern memory circuit, constituted by memories containing the information necessary for defining the different types of patterns, (B4) a configuration selection circuit, whose function is to validate the control cycle of the memory and finally supply the word to be written into the image memory.

Preference is given to the storage of information relating to three types of patterns, which correspond to three different needs. These three types are as follows in an order of increasing complexity:

— the first relates to a pattern constituted by a uniform background, which is typically the case of simple hatching, such a pattern being completely described by a value $V_p$ relating to the appearance of all the points of the pattern and by its dimensions E and L, it will subsequently be designated as "point pattern";

— the second type of pattern used is such that, starting from the same skeleton, the pattern can assume one or other of several predetermined appearances, e.g. a pattern with three shades, a first pattern can use green, red and white and a second pattern black, blue and cyan, this type of pattern being described by a skeleton, each of whose elements can assume one value from among several, whereby said value is defined by a correspondence table giving, for a given index k, the corresponding value V(k), such a pattern being designated hereinafter by "skeleton pattern";

— the third type of pattern used and which is the most complex uses points all of whose values are defined, eachpoint of this motif being described by a particular value directly applied to the image memory, said pattern being designated hereinafter as the "true pattern".

In order to store a collection of types of patterns, the pattern memory circuit comprises a first memory allocated to point patterns, a second memory allocated to skeleton patterns and a third memory allocated to true patterns. To these memories is added a pattern selection logic circuit and a multiplexer supplying the word corresponding to the selected pattern in the selected type.

Preferably, numbers which are powers of two are chosen as mesh parameters $\Delta X$, $\Delta Y$, $\Delta H$ and $\Delta V$. Thus, in this case, the division and product operations intervening in the relations (1) and (1') given hereinbefore amount of bit displacements and the modulo functions of the relations (2), (3), (2') and (3') can easily be carried out. Moreover, by retaining the two complement binary representations for the negative numbers, relations (2) and (3) or (2') and (3') can be realised by the same circuits as for the positive numbers.

More specifically, this hypothesis of magnitudes equal to powers of two makes it possible to simplify the relations (1) and (1') in the following way. These relations show functions:

$$\frac{(y + \text{off}_y)}{\Delta Y} \cdot H \text{ and } \frac{(\text{xoff}_x)}{\Delta X} \cdot \Delta V$$

which can be written in the general form:

$$f = \frac{z}{\Delta 1} \cdot \Delta 2$$

in which $\Delta 1$ and $\Delta 2$ alternately represent $\Delta Y$, $\Delta X$ and $\Delta H$, $\Delta V$. If $\Delta 2 = 0$ the function f is the zero function, whilst if $\Delta 2 \neq 0$, $\Delta 1$ and $\Delta 2$, which are powers of two, can be written in form:

$$\Delta 1 = 2^{d_1} \text{ and } \Delta 2 = 2^{d_2} \text{ with for example } d_1 > d_2.$$

In this case, we obtain f by displacing z by $(d_1 - d_2)$ bits towards the least significant and by setting at zero the $d_2$ least significant bits of the results, said operations being easily carried out.

With regards to relations (2), (3) and (2') and (3'), they involve expressions of form t modulo $\Delta 1$. On taking $\Delta 1 = 2^{d_1}$, this represents also only retaining $d_1$ least significant bits of t, if t is positive. This very simple principle is used for processing relations (2) and (2'). It can also apply when $\alpha^*$ (or $\beta^*$) is negative, which corresponds to relations (3) or (3'). Thus, it is not necessary in this special case to previously analyze the sign of $\alpha^*$ (or $\beta^*$) to obtain $\alpha$ (or $\beta$).

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 5:
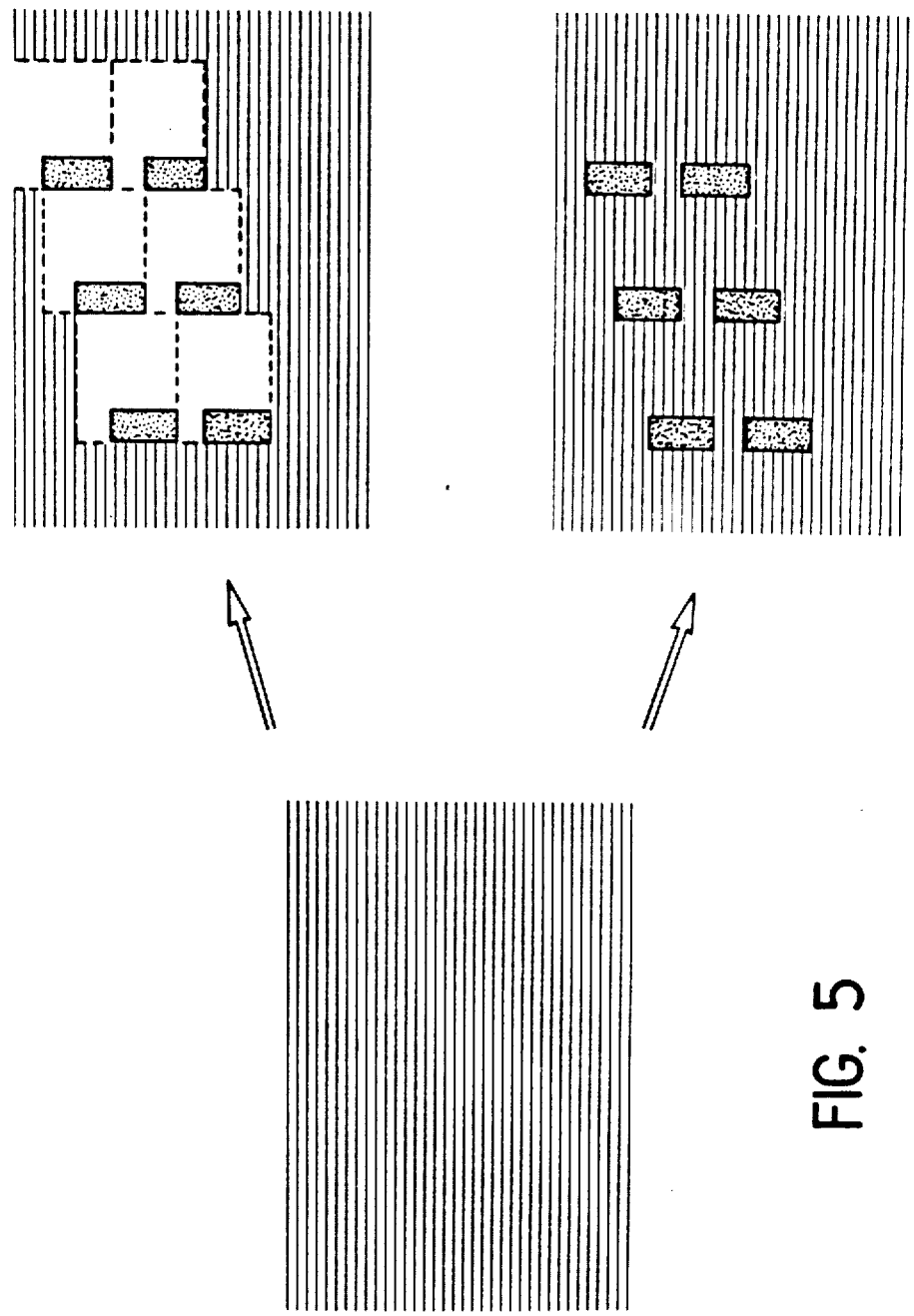
FIG. 5, already described, a uniform background mesh and a transparent background mesh.
Figure 10:
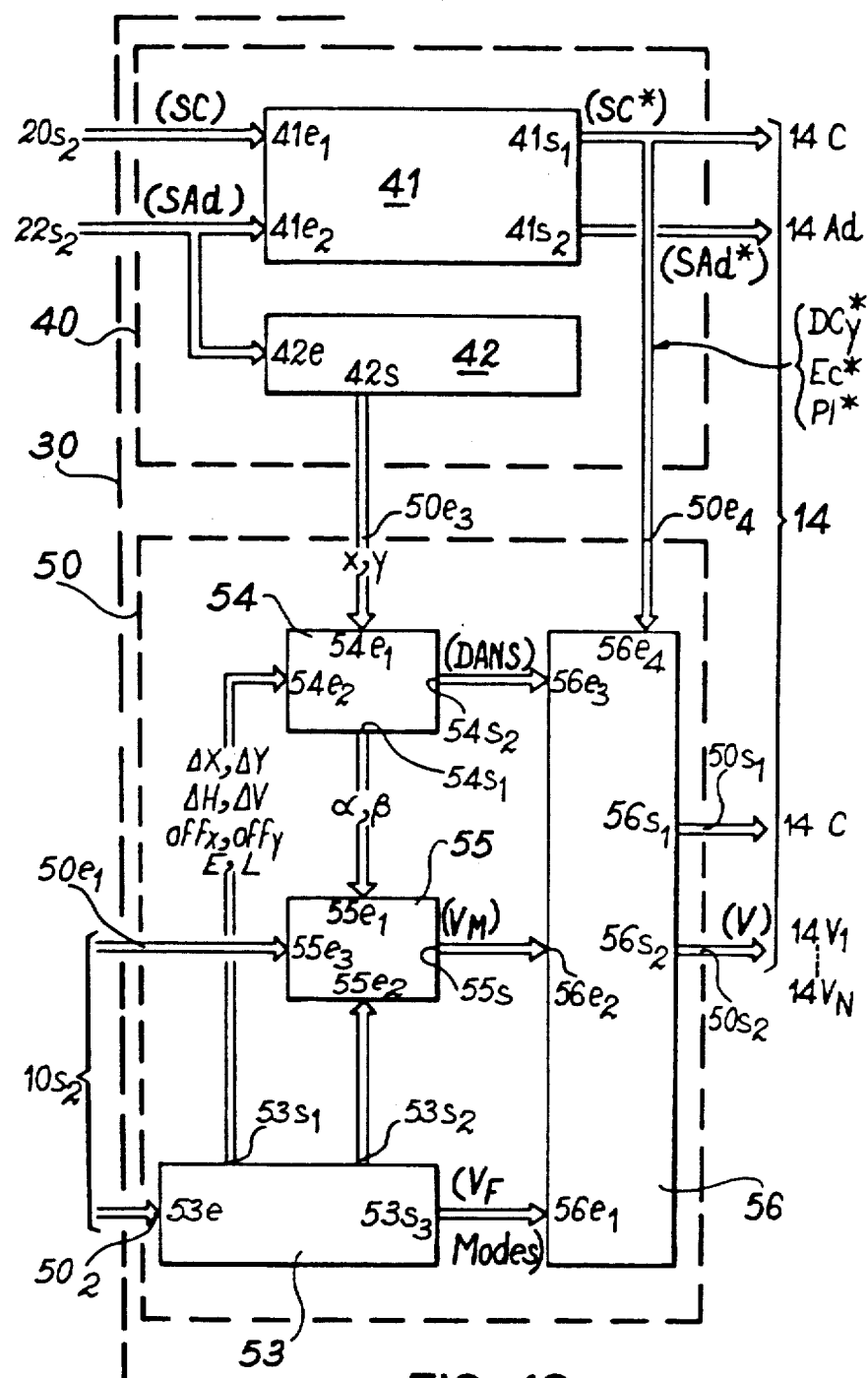
FIG. 10 a diagram of the system for recording image textures in the image memory according to the invention.

The system for writing or recording in an image memory image texture signals which, in FIG. 5, carry the reference 30, is synoptically shown in FIG. 10. This system essentially comprises two parts, namely a part 40 for processing the access cycle to the image memory and a part 50 for the determination of the word to be written into the memory. These two parts will be described in turn.

The first part comprises:

($A_1$)—A circuit 41 for the transmission with a time lag of signals controlling the access cycle to the memory, this circuit 41 has a first input $41e_1$ connected to the second group of outputs $20s_2$ of sequencer 20 and $22s_1$ of the graphic display processor 22. This input receives control signals SC. It has a second input $41e_2$ connected to the second group of outputs $22s_2$ of the graphic display processor 22. This second input receives the addressing signals SAd. Circuit 41 has a first output $41s_1$ supplying control signals SC* delayed by a fixed time, and a second output $41s_2$ supplying address signals delayed by the same time, namely SAd*. The first output $41s_1$ is connected to the control input 14C of the image memory 14 and the second output $41s_2$ to the addressing input 14Ad of this image memory.

($A_2$)—A shaping circuit 42, which has an input $42e$ connected to the second group of outputs $22s_2$ of the graphic display processor 22, whence it receives address signals SAd. It has an output $42s$ supplying two signals x, y representing coordinates (in the planes of the image memory) of the point having the address applied to input $42e$.

Part 50 for determining the word to be recorded in the memory comprises:

($B_1$)—An operation parametrization circuit 53 having an input $53e$ connected to the second group of outputs $10s_2$ of the microcomputer 10 and receiving from said microcomputer signals defining the operating methods of the system. This circuit has a first output $53s_1$ supplying eight signals, respectively $\Delta X$, $\Delta Y$, $\Delta H$, $\Delta V$, off$_x$, off$_y$, E, L defining a repetitive pattern corresponding to a particular image texture. It has a second output $53s_2$ supplying choice (CHOIX) signals selecting the pattern to be used in the texture to be displayed. It has a third output $53s_3$ supplying signals (VF, modes) defining one from among several operating modes (with or without a pattern, uniform or transparent background).

($B_2$)—A computing or calculating circuit 54 which comprises: a first input $54e_1$ connected to output $42s$ of shaping circuit 42 and receiving signal x, y and a second input $54e_2$ connected to the first output $53s_1$ of the parametrization circuit 53 and receiving the eight signals supplied by this output. Circuit 54 also has a first output $54s_1$ and a second output $54s_2$. This circuit 54 is able:

to calculate the two coordinates $\Delta^*$ and $\beta^*$ referred to hereinbefore on the basis of the addresses x, y and signals $\Delta X, \Delta Y$, $\Delta H$, $\Delta V$, off$_x$, off$_y$ by relations (1) and (1') referred to hereinbefore;

to determine whether $\alpha^*$ is positive or zero, in which case the circuit calculates a relative coordinate $\alpha$ equal to $\alpha^*$ modulo $\Delta X$, if not circuit 54 calculates $\alpha$ by the relation:

$$[\Delta X - (|\alpha^*| \text{ modulo } \Delta X)] \text{ modulo } \Delta X$$

to determine whether $\beta^*$ is positive or zero, in which case the circuit calculates a coordinate $\beta$ equal to $\beta^*$ modulo $\Delta Y$, if not the circuit calculates a relative coordinate $\beta$ by:

$$[\Delta Y - (|\beta^*| \text{ modulo } \Delta Y)] \text{ modulo } \Delta Y$$

to determine whether the coordinate $\alpha$ is less than E and whether, at the same time, coordinate $\beta$ is less than L, in which case a signal (DANS) is produced. Circuit 54 supplies at its first output $54s_1$ coordinates $\alpha$ and $\beta$ and at its second output $54s_2$ the signal (DANS).

($B_3$)—A pattern memory circuit 55, constituted by memories containing information defining several types of patterns as indicated hereinbefore and for each type a number of patterns. This circuit 55 comprises a control input $55e_1$ connected to the first output $54s_1$ of the computing circuit 54 and receiving the relative coordinates $\alpha,\beta$, a second selection input $55e_2$ connected to the second output $53s_2$ of the operation parametrization circuit 53, said input $55e_2$ receiving the CHOIX selection signals of one pattern from among several and a third input $55e_3$ connected to the general input $50e_1$, which is itself connected to output $10s$ of computer $10s_1$ of computer 10 and receiving the pattern loading signals. Circuit 55 also has an output $55s$ supplying a signal $V_M$ which can be written into the image memory for the chosen pattern.

($B_4$)—A configuration selection circuit 56, which comprises: a first input $56e_1$ connected to the third output $53s_3$ of the operation parametrization circuit 53 and receiving signals (VF/modes) determining an operating mode; a second input $56e_2$ connected to the output $55s$ of the pattern memory circuit 55 and receiving the signal $V_M$; a third input $56e_3$ connected to output $54s_2$ of the computing circuit 54 and receiving the signal DANS; a fourth input $56e_4$ connected to the first output $51s_1$ of the memory cycle transmission circuit 41 and receiving the delayed control circuit SC*, said circuit 56 being able, as a function of the signal DANS and the signal determining the operating mode, to validate the control cycle defined by signal SC* and to determine, as a function of the sign the word $V_M$, to be written into the image memory. Circuit 56 has a first group of outputs $56s_1$ connected to the general output $50s_1$ of circuit 50, which is itself connected to the control input 14C of the image memory and which supplies signals controlling the writing into the memory. There is a second group of outputs $56s_2$ connected to the general output $50s_2$ of circuit 50, which is itself connected to the N validation inputs $14V_1 \ldots 14V_N$ of the image memory and supplying the word V to be written into said memory. Fundamentally, the system shown in FIG. 10 operates in the following way. Firstly, inserted between the address generator and the image memory, it behaves with respect to the former as an image memory and with respect to the latter as an address generator. In order to compensate the processing time inherent in the actual system, the first part 40 (formed by circuits 41 and 42) transmits to the image memory the signals which it receives (SC and SAd) from the address generator with a constant time lag } (hence SC* and SAd*). The first function of system 30 is consequently a time lag or delay function, which is fulfilled by circuit 41. The second function of this first part of the system is to reconstitute, on the basis of address signals SAd supplied by the address generator, the coordinates x, y of the current point. This function is performed by circuit 42. The function of the second part 50 is essentially to convert the coordinates x, y supplied by part 40 into a word V, which is to be written into the image memory in accordance with previously defined procedures. It is this part 50 which realises the aforementioned texture generation process.

This process uses several parameters defining several options or operating modes, namely:

- the "normal" mode or the "pattern" mode: in the normal mode the value to be written is constant (and designated $V_F$) and defined beforehand, whilst in the pattern mode it is a function of the selected texture (and is designated $V_M$);
- the mesh background which can be transparent or uniform and for a transparent background the content of the image memory is not modified, whereas for a uniform background, the value to be written is constant (designated $V_F$) and is defined beforehand;
- the definition of the mesh, which is given by the quantities $\Delta X$, $\Delta Y$, $\Delta H$, $\Delta V$, $off_x$, $off_y$;
- the description of the pattern, which is defined by E, L, by the type of pattern and by the content of the patterns.

In order to fulfil these various tasks, part of system 30 is organised into four circuits:

- the operations parametrization circuit 53,
- the circuit 54 for calculating $\alpha$ and $\beta$,
- the pattern memory circuit 55,
- the configuration selection circuit 56.

Before describing the embodiments of the various circuits forming parts 40 and 50, their functions will be defined and their structure will be immediately apparent.

Circuit 41 firstly receives from circuits 20 and 22, the address and control signals (SAd, C) and transmits them to the image memory with a delay which compensates the response time (SAd*, C*). In addition, this circuit supplies circuit 56 with three signals processed from delayed control signals, namely:

- a "start of cycle" signal (designated DCy*), which becomes active when the cycle taking place effectively commences in the image memory;
- a "writing" signal (Ec*), which is the writing control supplied by address generator 20-22 and which is delayed by circuit 41,
- a "pen" signal (P1*), which is the effective writing control supplied by address generator 20-22 and which is delayed by circuits 41. (In these notations, the symbol * indicates a delay of duration $\rho$).

Circuit 42 interprets the address signals SAd for supplying a pair of coordinates (x, y), which are stable during the operation of part 50.

The operation parametrization circuit 53 receives controls describing the operating procedures from the microcomputer and these controls determine:

- the normal mode or the pattern mode,
- the "transparent" mode or the "uniform" mode relating to the mesh background,
- the value $V_F$ used in the normal mode or in the uniform mesh background,
- the values $\Delta X$, $\Delta Y$, $\Delta H$, $\Delta V$, $off_x$ and $off_y$ describing the mesh,
- the values E and L fixing the size of the pattern,
- the choice of the pattern used.

Each of these controls can be defined by the microcomputer and can be modified by it, or conversely can be fixed once and for all in the system. All these control signals are stored in circuit 53, which then switches them to the other circuits of part 50, namely:

- to circuit 54 to enable the calculation of $\alpha, \beta$ and the determination of the logic (DANS) signal,
- to the pattern memory circuit 55 for the choice of a pattern,
- to circuit 56 for the selection of the normal, pattern, transparent or uniform mode and the transmission of $V_F$.

Figure 4A:
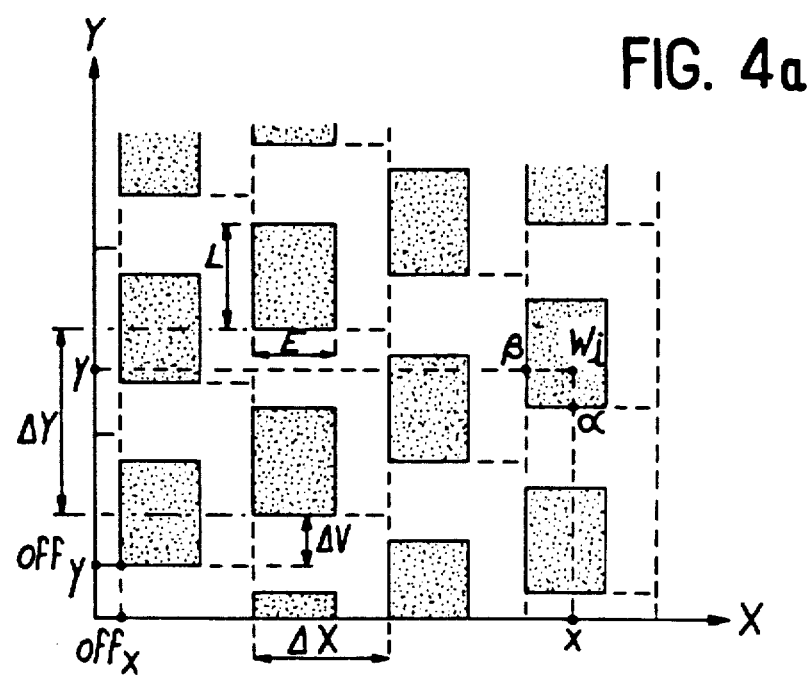
FIG. 4a, 4b, already described, the formation of a texture by the repetition of the same pattern.
Figure 4B:
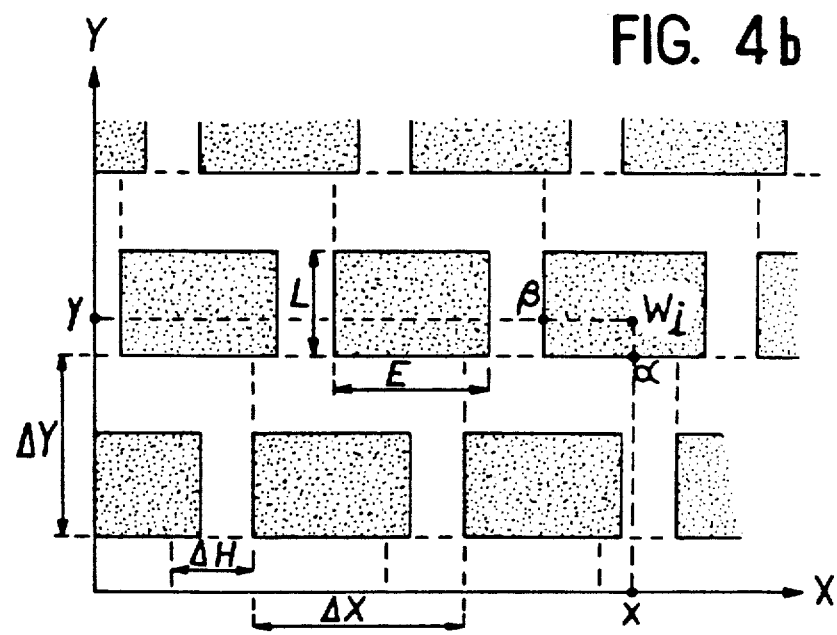

Circuit 54 converts the coordinates x, y of the current point which it receives from the shaping circuit 42, into relative coordinates $\alpha, \beta$ and for this purpose uses the characteristics of the mesh and the dimensions of the pattern, in the manner illustrated in FIGS. 4a and 4b. For selection circuit 56, it also processes the logic DANS signal.

The pattern memory circuit 55 has information relating to several types of patterns. This information is supplied thereto by the microcomputer, but can also be inherent in a special concept of the storage system (use of read-only memory).

On referring to the three already mentioned pattern types, the description of a point pattern consists of a choice of a particular value. The description of a skeleton pattern requires a matrix of points, whereof each element is designated by an index k, which fixes the value of the element in accordance with a predetermined table. The description of a true pattern requires a complete matrix, whereof each element can assume a particular value.

For each type of pattern, circuit 55 can have several different patterns:

- in the case of point patterns, it is necessary to store several values (one per pattern), each value being defined by an index p (value designated Vp),
- in the case of skeleton patterns and in the case of true patterns, several matrixes are required.

Circuit 55 receives from the parametrization circuit 53, the logic information making it possible to select one of the three possible pattern types and within said type, a particular pattern. Knowing this pattern and the pair $\alpha, \beta$, circuit 55 is able to supply the selection circuit 56 with the value $V_M$ of the word to be written into the memory for the considered point.

With regards to circuit 56, it validates the writing circle taking place and definitively selects the value (V) to be written into the image memory, as a function of the selected operating mode (normal/pattern-/uniform/transparent). For this purpose, it receives from parametrization circuit 53 the information relating to this mode, as well as the value $V_F$, and from the pattern memory 55, the value $V_M$, as well as the logic DANS signal processed by circuit 54. The following table I describes the operation of this circuit by showing in which case the writing into the image memory is blocked (namely in the "pattern" mode, when the point is not in the pattern and the background is transparent):

TABLE I

|  | Normal mode | Pattern mode | | |
|---|---|---|---|---|
|  |  | DANS=true | DANS=false | |
|  |  |  | Uniform background | Transparent background |
| Blocking of writing | No | No | No | Yes |

TABLE I-continued

| | | Pattern mode | | |
| --- | --- | --- | --- | --- |
| | | | DANS=false | |
| | | | Uniform background | Transparent background |
| | Normal mode | DANS=true | | |
| V | $V_F$ | $V_M$ | $V_F$ | / | and which of the words $V_F$ and $V_M$ is transmitted to the image memory ($V_M$ is only transmitted in the pattern mode, when the processed point is in the pattern).

Thus, circuit 56 supplies the image memory with the N bits constituting the value of the word V to be written into the image memory. However, it should be noted that this writing or recording is ineffective in two obvious cases:

when the cycle taking place is an image memory reading cycle for the video generator, when the cycle taking place is a cycle for clearing or erasing a point, the end bits then being forced into an inactive state, which is generally zero.

It should also be noted that in practice, the results supplied by circuit 56 must be stored, in order that they remain stable during the complete processing of an image memory access cycle, in order to prevent any interference with the following cycle.

Special embodiments of circuits 54, 55 and 56 will now be described relative to FIGS. 11, 12 and 13.

Figure 11:
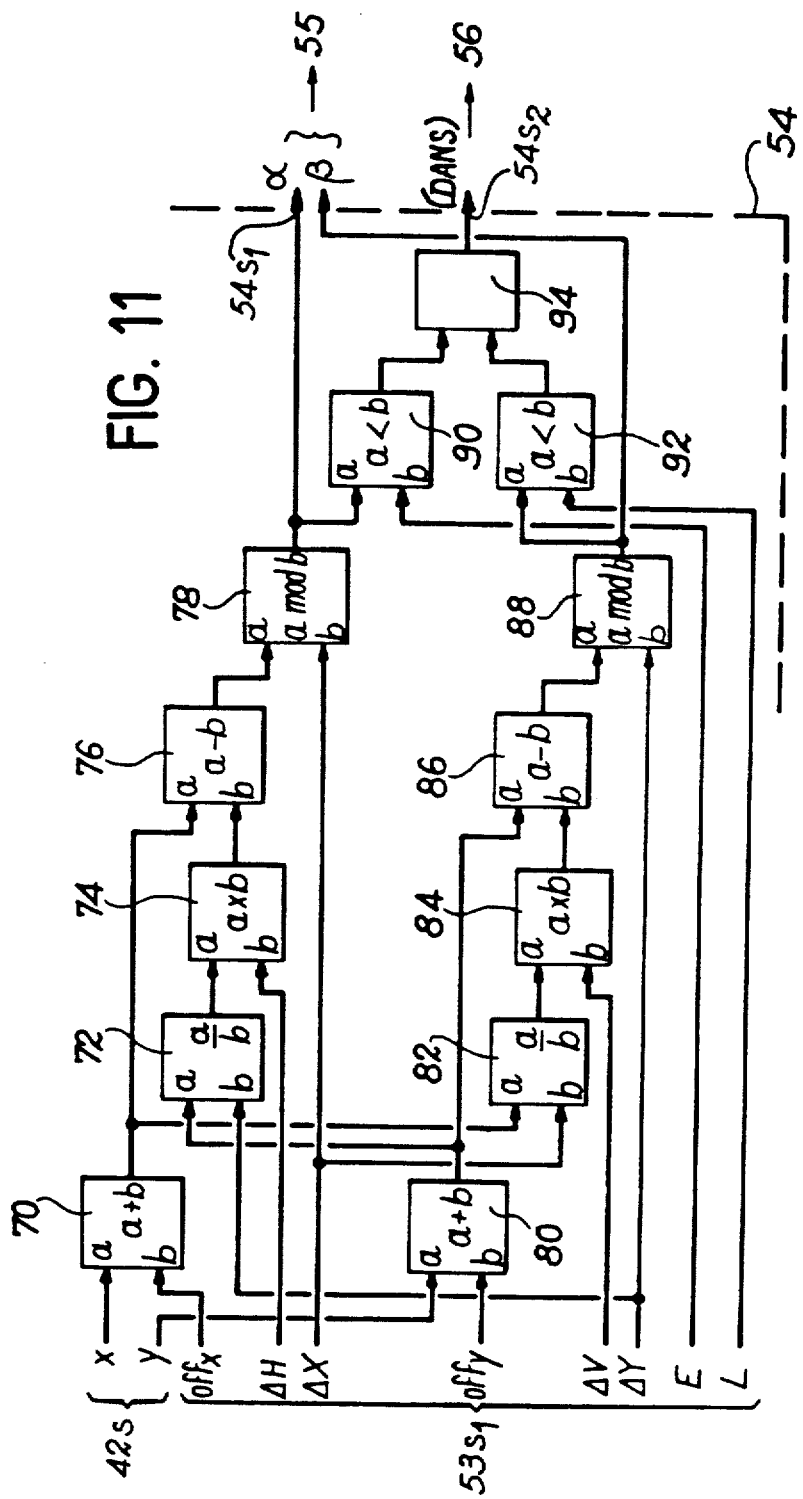
FIG. 11 the diagram of the circuit for calculating coordinates $\alpha$ and $\beta$.

FIG. 11 shows the diagram of a circuit 54 for calculating α and β, functioning according to the principle defined hereinbefore, in the case where the different quantities defining the mesh are powers of two.

As shown, the circuit comprises two analog channels, the first incorporating an adder 70 with two inputs receiving x and off$_x$, a divider 72 receiving ΔY and the results of the addition performed by adder 80, a multiplier 74 receiving ΔH and the result of the division performed by divider 72, the subtracter 76 connected to 70 and 74, a circuit 78 fulfilling the modulo ΔX function and receiving for this purpose ΔX and the result of the subtraction performed by subtracter 76. The second channel comprises identical circuits, namely an adder 80, a divider 82, a multiplier 84, a subtracter 86 and a modulo ΔY calculating circuit 88.

As results directly from the equations given hereinbefore, the first channel supplies coordinate α and the second channel the coordinate β. In order to obtain the logic DANS signal (which indicates whether the point in question is inside or outside an elementary pattern) circuit 54 also has a first comparator 90 receiving α and E, the second comparator 92 receiving β and L and a logic AND gate 94, which supplies the DANS signal.

Figure 12:
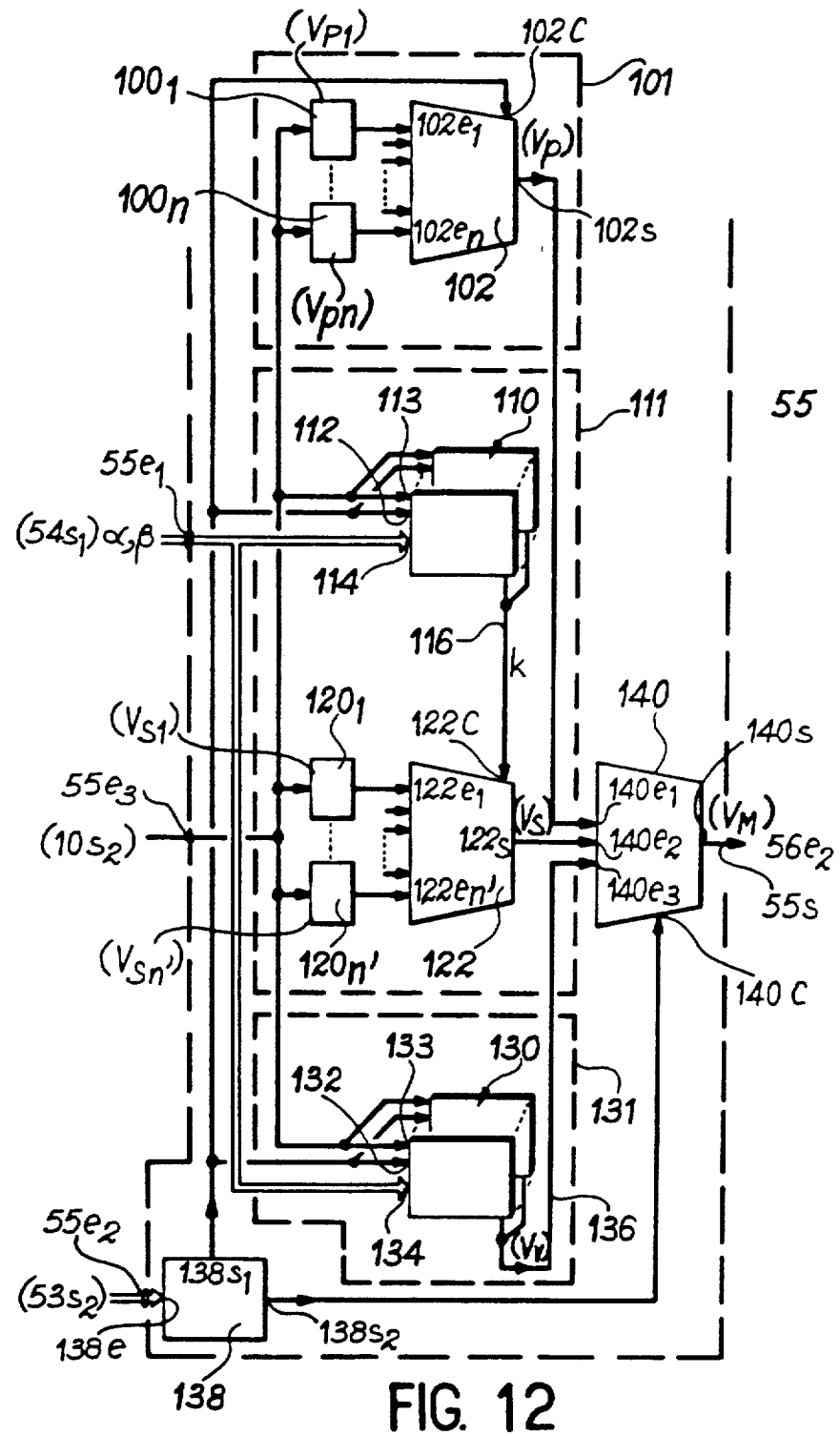
FIG. 12 a diagram of the pattern memory circuit.

FIG. 12 shows a special embodiment of a pattern memory circuit. As shown, this circuit comprises a point pattern memory circuit 101, a skeleton pattern memory circuit 111 and a true pattern memory circuit 131.

The point pattern memory circuit 101 comprises a plurality of n memories $100_1 \ldots 100_n$, each memory having an input connected to the second output $10s_2$ of computer 10. These memories contain values $V_{P_1} \ldots V_{P_n}$. The circuit also comprises a multiplexer 102 having n inputs $102e_1 \ldots 102e_n$, each connected to one of the memories $100_1 \ldots 100_n$, a control input 102C and an output 102s supplying a signal Vp.

The skeleton pattern memory circuit 111 incorporates a memory 110 formed from several memory planes, each plane having a validation input 112, a loading input 113 connected to the second output $10s_2$ of computer 10 and an addressing input 114 connected to the output $54s_1$ of circuit 54. These memory planes have a common output 116. This circuit also incorporates a plurality of n' memories $120_1 \ldots 120_{n'}$, n' being an integer at least equal to 1, each containing a particular word $Vs_1 \ldots Vs_{n'}$. The circuit finally comprises a multiplexer 122 with n' inputs $122e_1 \ldots 122e_{q'}$, each connected to one of the memories $120_1 \ldots 120_{n'}$, to a control input 122C connected to the common output 116 of memory 110 and to an output 122s supplying a word Vs characterizing the selected skeleton pattern.

The true pattern memory circuit 131 comprises a memory 130 formed from planes, each constituted by a memory point matrix, each plane of memory 130 having a validation input 132, a loading input 133 connected to the second group of outputs $10s_2$ of computer 10, an addressing input 134 connected to output $54s_1$ of calculating or computing circuit 54 and a single output 136 supplying a Vv inherent in the selected pattern.

The operation of these memory circuits results from what has been stated hereinbefore in connection with the manner of selecting a pattern. In the case of circuit 101, it is merely necessary to apply to the control input 102C of multiplexer 102, the signal which will validate the input corresponding to the selected memory from the n available. In the case of circuit 111, the same process makes it possible to select one of the n' memories connected to multiplexer 122, with the difference that the signal applied to the control input 122C changes in the same pattern (index k), which makes it possible to define the skeleton of the pattern. In the case of circuit 131, there is no longer any multiplexing, because the entire content of one of the memory planes 130 is used.

In addition to the three circuits 101, 111 and 131, the pattern memory circuit 55 comprises a logic selection circuit 138 having an input 138e connected to the second output $53s_2$ of the operation parametrization circuit 53 and receiving a signal determining the choice of a pattern, a first output $138s_1$ supplying a signal determining a pattern, said output being connected to the control input 102C of multiplexer 102 of the point pattern memory circuit 101, as well as to the validation input 112 of one of the memory planes of memory 110 of the skeleton pattern memory circuit 111, as well as to the validation input 132 of one of the memory planes of memory 130 of the true pattern memory circuit 131. Circuit 138 also has a second output $138s_2$ supplying a signal determining the selected pattern type (point pattern, skeleton pattern, true pattern).

Finally, circuit 55 comprises a multiplexer 140 having three inputs $140e_1$, $140e_2$, $140e_3$, connected to the outputs of the pattern memory circuits 101, 111, 131, to a control input 140C connected to the second output $138s_2$ of the logic selection circuit 138 and to an output 140s supplying the word $V_M$ selected from among Vp, Vs and Vv. Output 140s constitutes the output 55s of the overall pattern memory circuit, which is connected to the second input $56e_2$ of the selection circuit 56.

Figure 13:
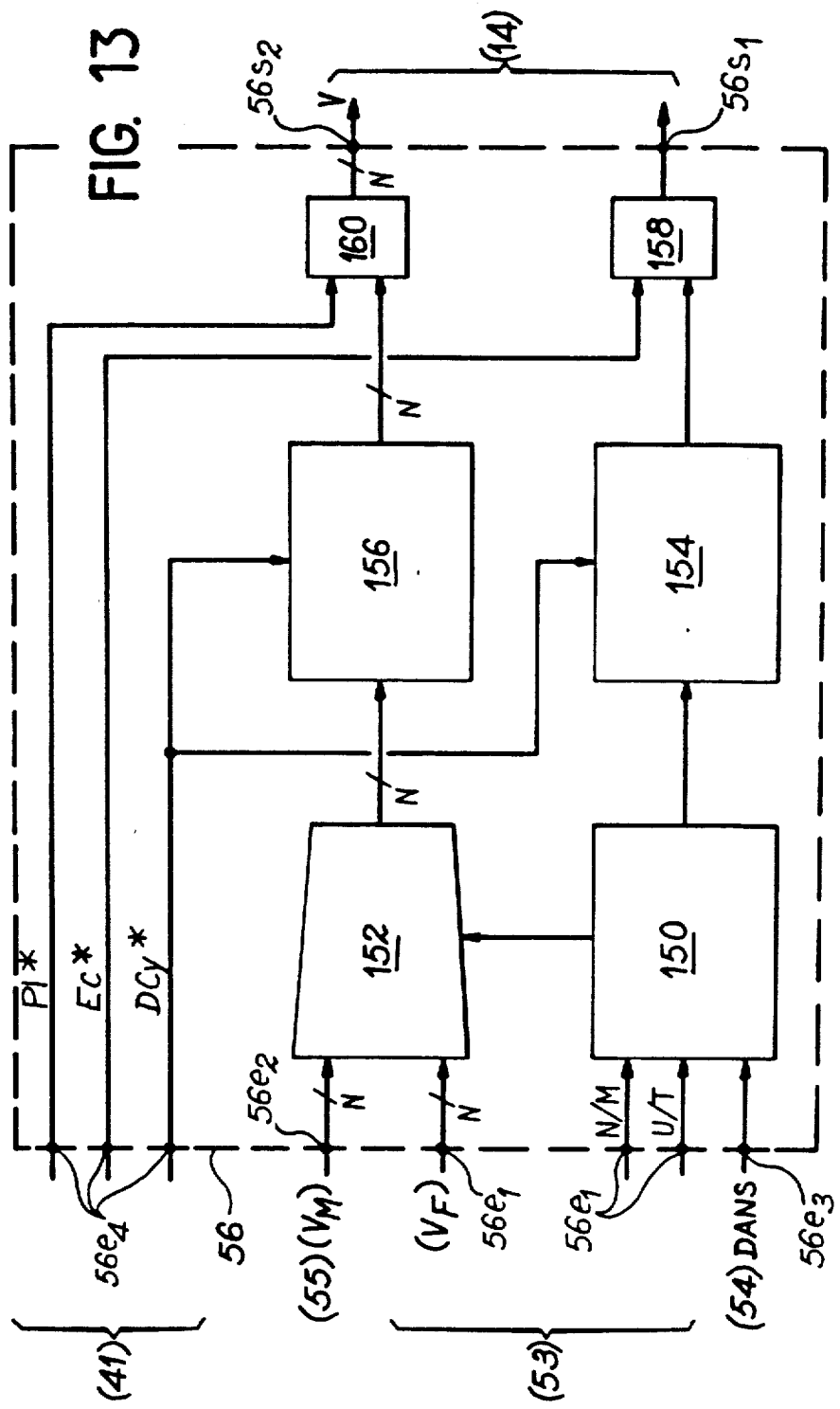
FIG. 13 the diagram of the configuration selection circuit.

The configuration selection circuit 56 is shown in FIG. 13 and comprises:

a logic decoding circuit 150 with three inputs, two connected to $56e_1$ and respectively receiving the signals N/M and U/T determining the normal/pattern modes and the uniform/transparent modes and the third connected to 56e₃, from where it receives the DANS signal from 54;

a multiplexer 152 with two inputs of N bits connected in one case to 56e₁, from where it receives the V_F from 53, and in the other case to 56e₂, from where it receives V_M from 55, said multiplexer being controlled by logic circuit 150;

a first storage circuit 154 connected to 150 and storing the writing validation signal, said circuit being controlled by the delayed signal indicating the start of the cycle (DCy*) from 51;

a second circuit 156 for storing the signal supplied by multiplexer 152, said circuit also being controlled by DCy*;

a first logic AND gate 158 with two inputs, one connected to 154 and the other to one of the inputs 56e₄, from where it receives the delayed writing signal (EC*) from 41 and whose output is connected to output 56s₁;

a second logic AND gate 160 with two inputs, one connected to 156 and the other to one of the inputs 56e₄, from where it receives the delayed "pen" signal (P1*), said gate having an output supplying the word V appearing at output 56s₂.

This circuit functions in the following way. The signal supplied to the decoding logic 150 controls the multiplexer 152, which supplies either V_M, or V_F, the selected word being stored in 156 at the start of the delayed writing cycle. Output 56s₁ supplies the writing control signal of the image memory and output 56s₂ the word V to be written.

Figure 14:
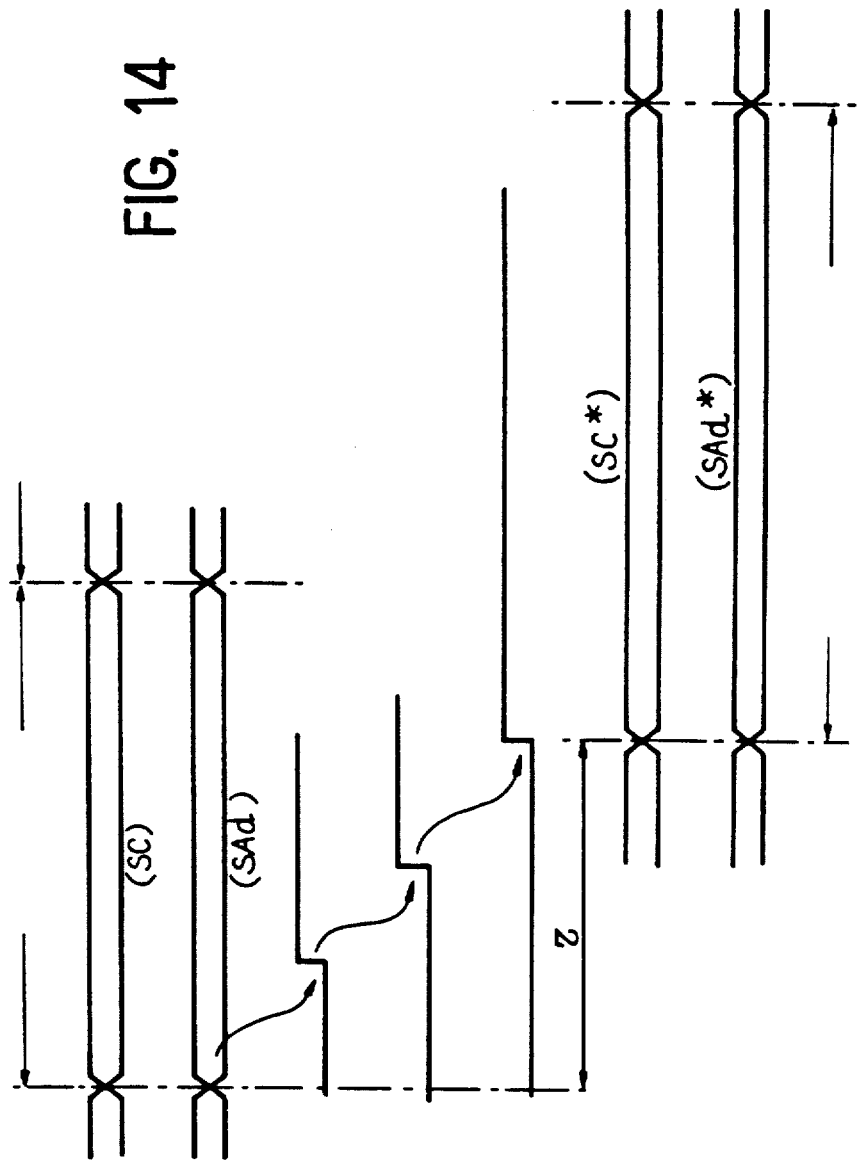
FIG. 14 a functional chronogram.

FIG. 14 gives the operating chronogram of the overall system 30. The control SC and addressing SAd signals appear on the first two lines. The following two lines show the appearance of signals x, y and α, β. The fifth line corresponds to the availability of the word V to be written into the memory. The word V is available with a time lag τ compared with the start of the writing cycle. The control and address signals (SC*, SAd*) must then be applied to the image memory with said time lag τ.

This chronogram makes it possible to observe that V must be obtained in a time less than the memory access cycle and that as the cycles defined by processor 22 are displaced, they must be stored and this is one of the functions of circuit 56.

FIGS. 15ff relate to a special embodiment of the system described hereinbefore. The characteristics of this system are as follows. The graphic processor 22 is the EFCIS circuit 9365 GDP, which will be designated hereinafter by its initials GDP (Graphic Display Processor.). The microcomputer is organised around a CPU 6800. The image memory is formed from three planes of 512×512 bits each, realised in a dynamic memory (circuits of type EF 4116). To each plane is allocated a primary colour of the video signal (red, green or blue) and the plots are made at high speed (1 point is defined and written in less than 2 μs.).

Figure 1:
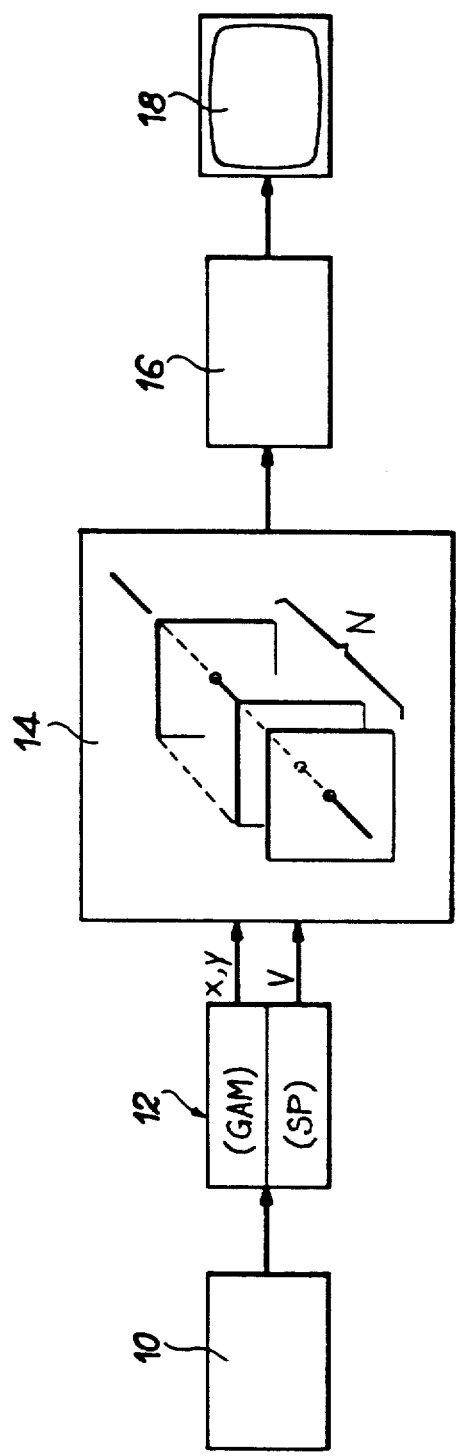
FIG. 1, already described, a general diagram of a prior art graphic terminal.
Figure 2:
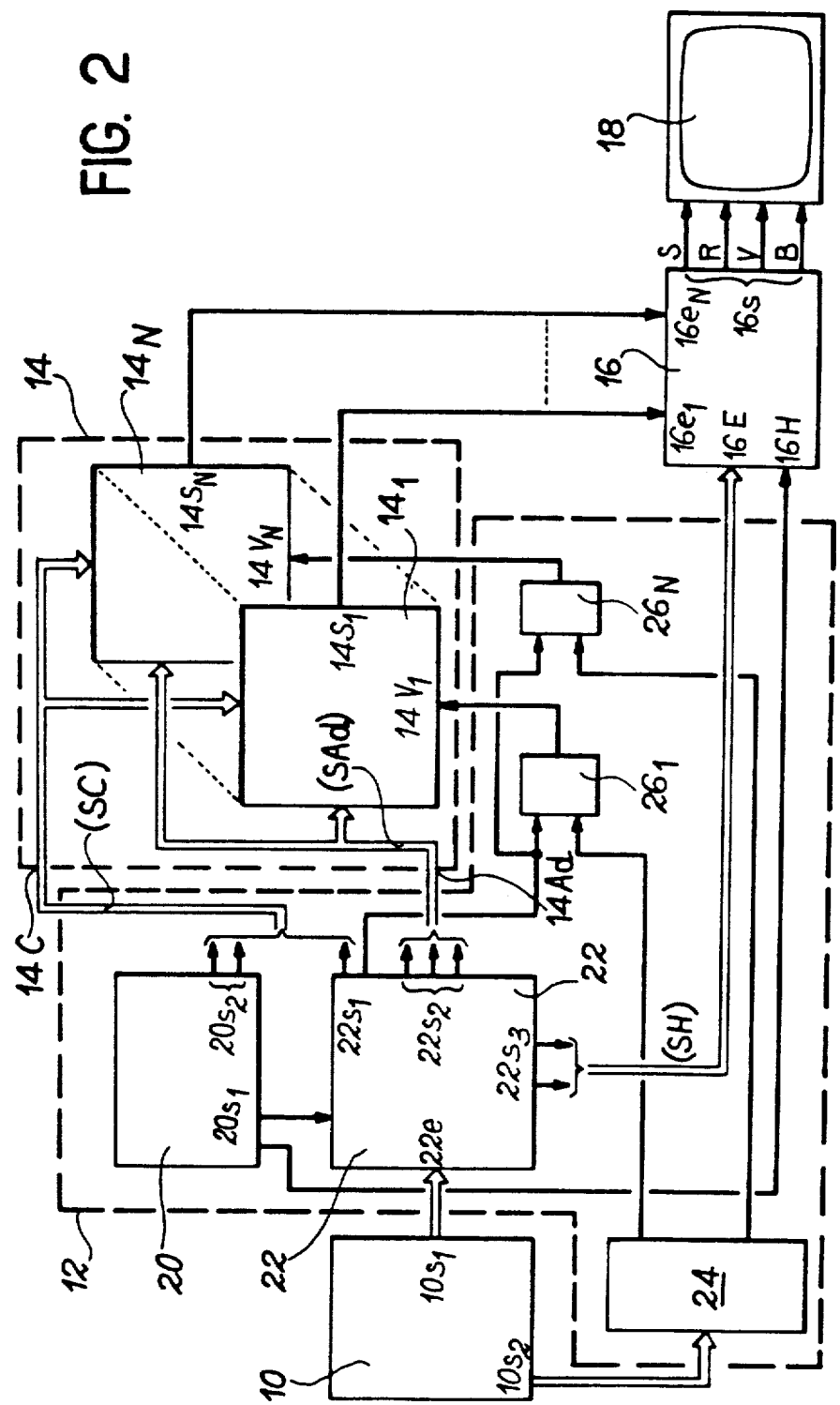
FIG. 2, already described, a more detailed diagram of such a terminal.
Figure 3:
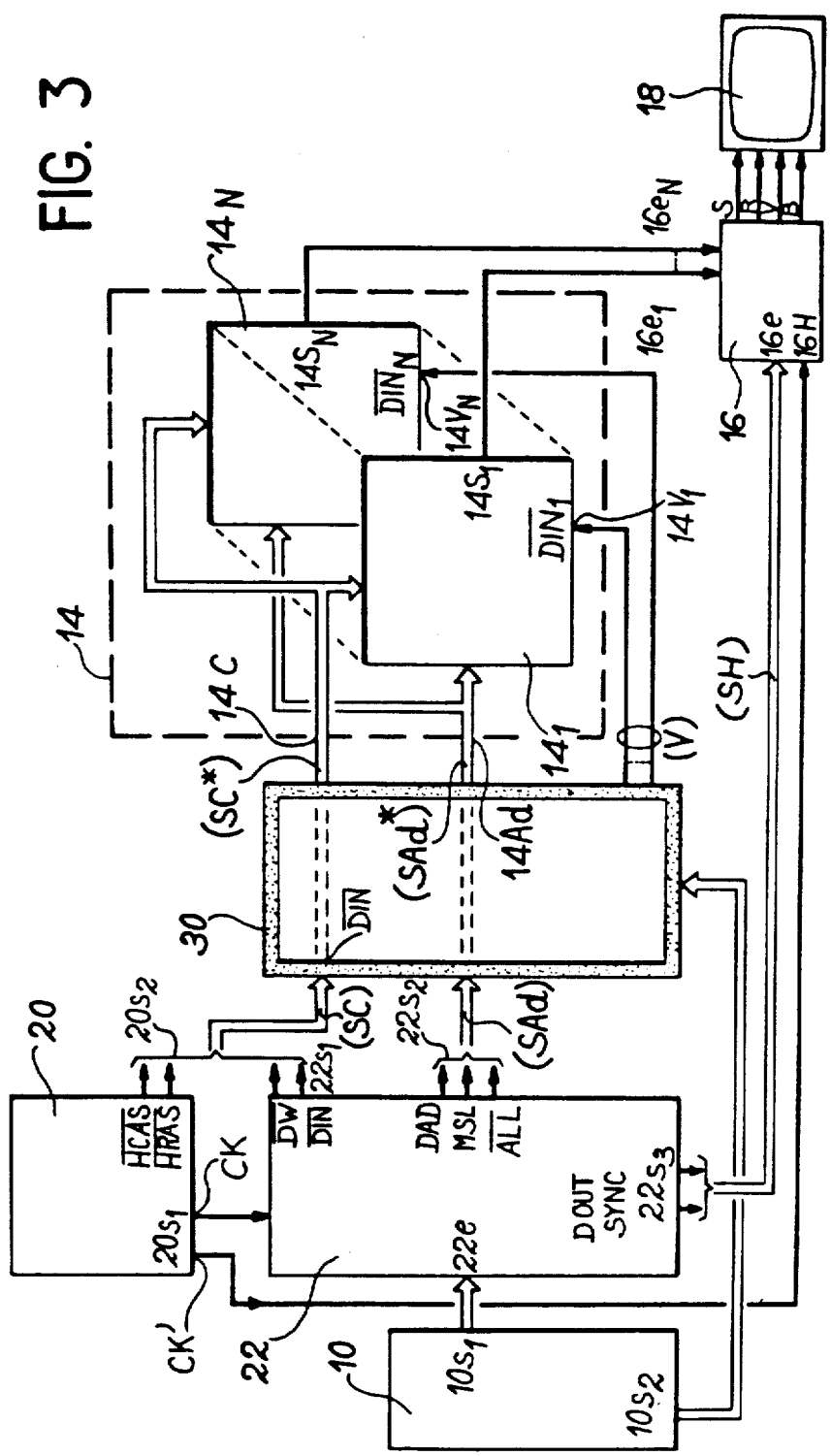
FIG. 3, already described, a terminal according to the invention with a system for writing image texture signals into an image memory.

FIG. 3, already described, corresponds to this embodiment to the extent that the notations appearing therein ($\overline{DW}$, DAD, MSL, $\overline{ALL}$, BLK, SYNC, $\overline{DIN}$, $\overline{HCAS}$, $\overline{HRAS}$) are those used by the designer.

In this embodiment, GDP 22 fulfils three functions:
determination of the points constituting a plot or trace, which is the aforementioned memory address generator function (GAM);
management of the image memory accesses, the GDP controlling the access conflicts by multiplexing in time the writing accesses (bit by bit) due to the traces, the reading accesses (byte by byte) for the video generator and the refreshing accesses of the dynamic memories;
control of the video signal, the GDP supplying the synchronization signal of the video generator (line and frame) and synchronizes the reading of the memory with this signal.

The operating instructions of circuit EF 9365 gives the operating time lag of this circuit and defines the form or shape of the different signals supplied by it ($\overline{DW}$, $\overline{DIN}$, DAD, MSL, $\overline{ALL}$, DOUT, SYNC).

Sequencer 20 supplies the different clock signals necessary, namely a signal CK for the GDP, two signals $\overline{HRAS}$ and $\overline{HCAS}$ for the dynamic memories and a clock signal CK' for the video generator. This sequencer is controlled by a 14 MHz oscillator.

The image memory is constituted by three identical planes, each constituted by 16 boxes or cases EF 4116. One plane receives the address signals, the signal $\overline{DW}$ (writing/reading) supplied by the GDP and a validation signal $\overline{DIN_1}$, $\overline{DIN_2}$ or $\overline{DIN_3}$ according to its rank.

The video generator, controlled by the sequencer, shapes the synchronization signal (SYNC) processed by the GDP and on the basis of the DOUT signal processes three signals of the primary colours R, G and B, (red, green and blue).

Figure 15:
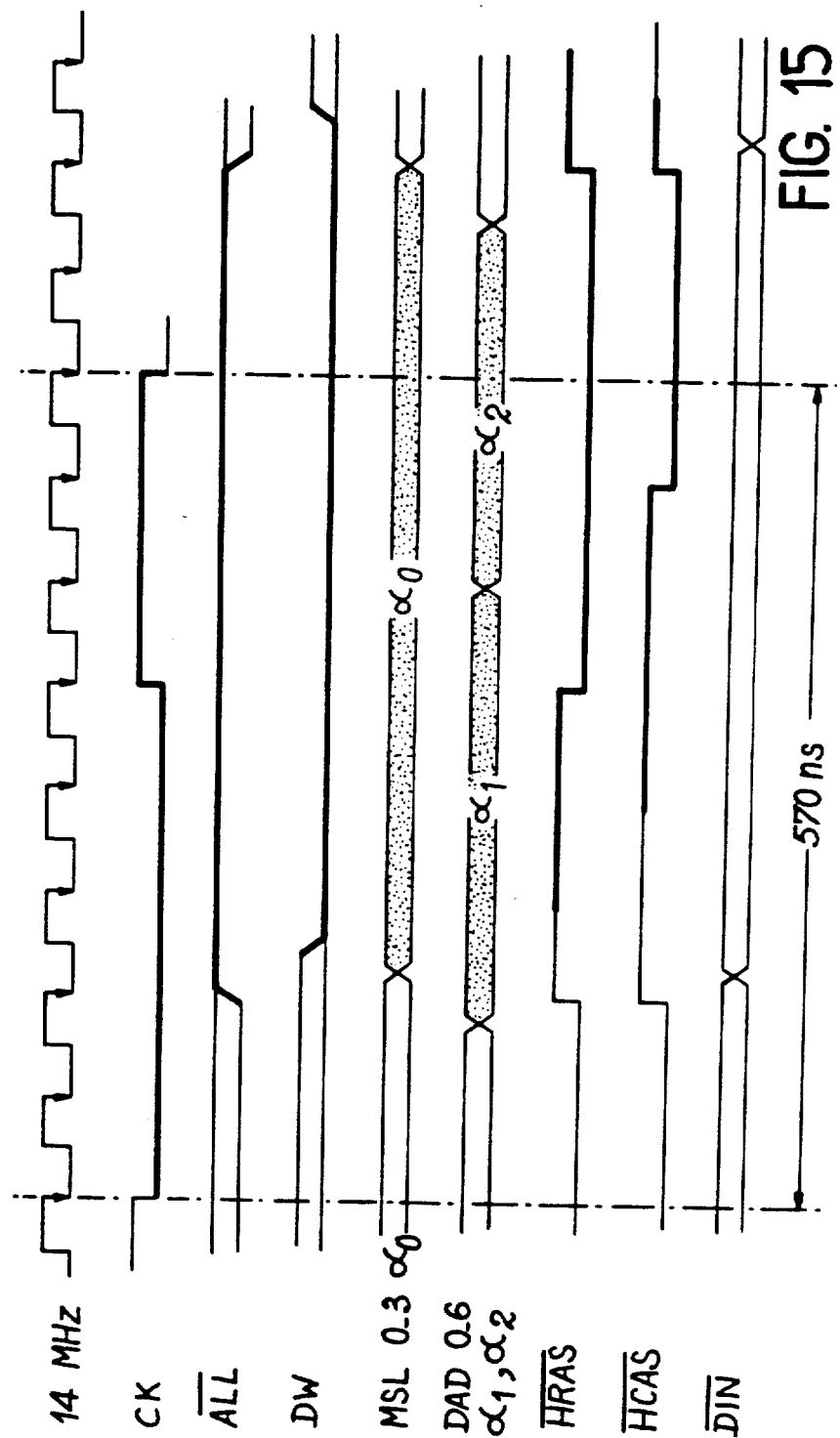
FIG. 15 a chronogram showing a cycle for writing or recording in an image memory.

FIG. 15 gives the chronogram of a writing access cycle for one point and this cycle is initiated by the GDP. The time reference is the clock signal CK controlling GDP and whose period is 570 ns. In such a cycle, the address of one point in the form that it is supplied by the GDP is represented by 9 bits for x (x₀ . . . x₈) and 9 bits for y (y₀ . . . y₈), namely also 18 bits. An address is expressed by the four MSL signals from 0 to 3 and the 7 DAD signals from 0 to 6. During a cycle the MSL 0–3 are fixed. However, the DAD 0–6 are time multiplexed. The 18 address bits are organised into three blocks α₀, α₁, α₂:

α₀ is supplied by MSL 0–3 and is fixed throughout the cycle,

α₁ is supplied by DAD 0–6, whilst CK = 0 and is sampled by the descending transition of $\overline{HRAS}$, α₂ is supplied by DAD 0–6, whilst CK = 1 and is sampled by the descending transition of $\overline{HCAS}$.

The distribution of x_i and y_i over MSL 0–3 and DAD 0–6 is given in the following table II:

TABLE II

| | MSL: | | | | DAD: | | | | | | |
|---|---|---|---|---|---|---|---|---|---|---|---|
| CK | 0 | 1 | 2 | 3 | 0 | 1 | 2 | 3 | 4 | 5 | 6 |
| 0 | x₀ | x₁ | x₂ | y₂ | x₈ | x₇ | x₆ | x₅ | x₄ | x₃ | y₁ |
| 1 | | | | | y₈ | y₇ | y₆ | y₅ | y₄ | y₃ | y₀ |

The meaning of the signals constituting the access interface to the image memory is as follows:
DAD 0–6: memory address, multiplexed according to CK,
MSL 0–3: memory address (complement of DAD 0–6 for the point accesses),
$\overline{ALL}$: access per byte if the signal is equal to 0, in which case MSL 0–3 are without significance, or point access if the signal is equal to 1,
$\overline{DW}$: writing access, when it is equal to zero, or in reading or refreshing it is equal to 1, $\overline{DIN}$ 0-2: values to be written into the plane 0-2 and if $\overline{DIN}$ equals 0 the point will be visible on the screen, $\overline{HRAS}, \overline{HCAS}$: control signals for the dynamic memories.

In the described embodiment, the different possible meshes are defined by:

2 values of ΔX, respectively 8 and 32,
2 values of ΔY, respectively 8 and 32,
3 values of ΔH for ΔV=0, respectively 0, ΔX/4, ΔX/2
3 values of ΔV for ΔH=0, respectively 0, ΔY/4, ΔY/2
2 values of off$_x$, respectively 0 and 4,
2 values of off$_y$, respectively 0 and 4.

Figure 6:
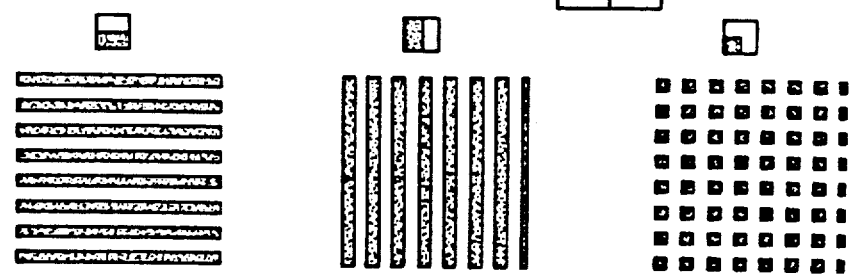
FIGS. 6, 7, 8, already described, examples of textures.
Figure 7:
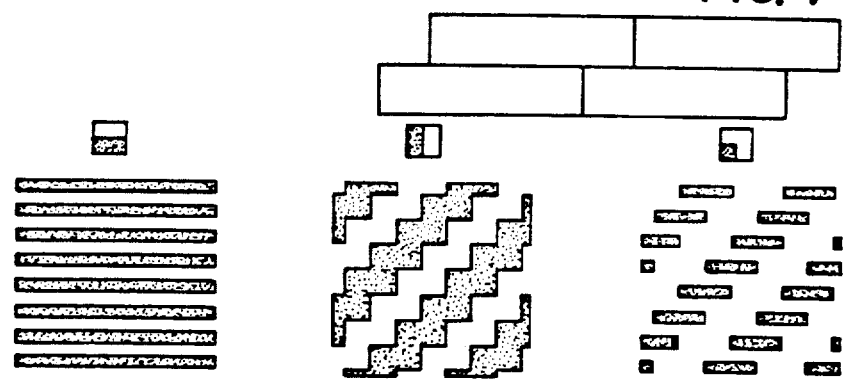
Figure 8:
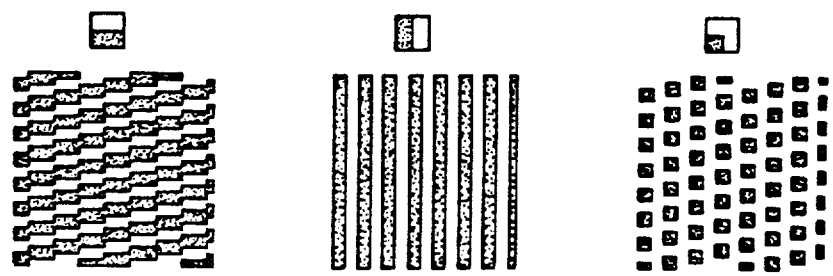
Figure 9:
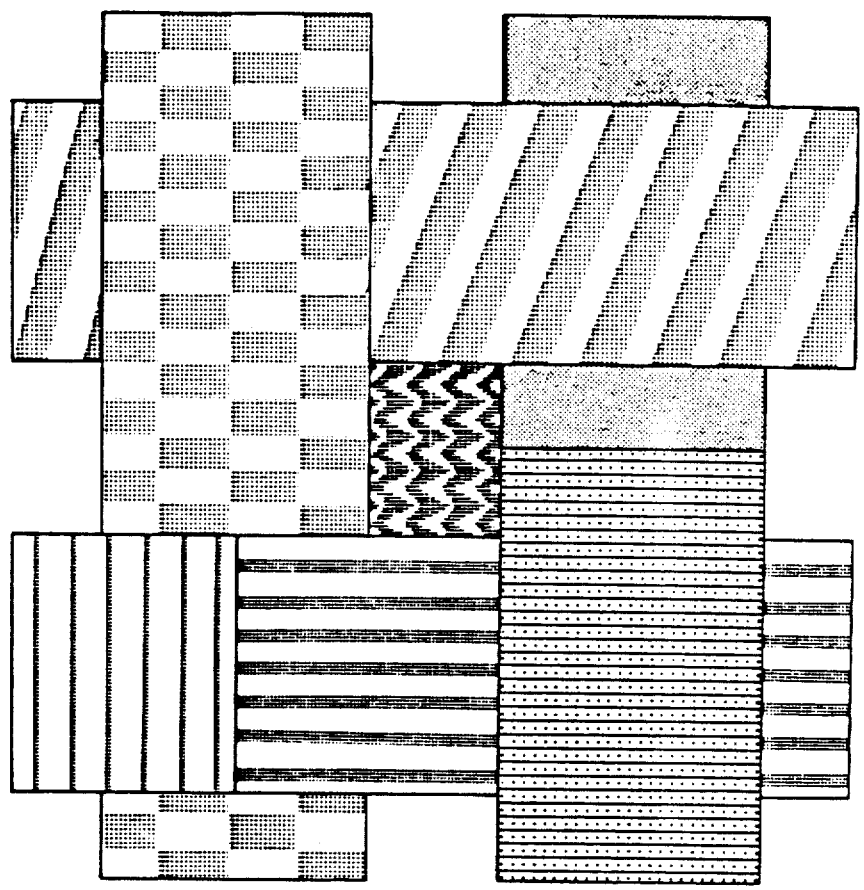
FIG. 9, already described, an example of the assembly of image textures made possible by the invention.

Thus, there are 20 different meshes and each can assume four different positions in an image. Certain of these meshes are shown in the already described FIGS. 6, 7 and 8.

The three types of pattern referred to hereinbefore are used in the embodiment described here:

(a) - point patterns, represented by a value Vp which can be modified by programme, (b) - skeleton patterns consisting of 8 variants fixed in the definition of the system, said skeletons being described by matrixes with bits equal to 0 or 1, (c) - true patterns, there being two predetermined patterns.

The dimensions E and I of the patterns are fixed in the definition of the system for the skeleton patterns and true patterns, whilst being programmable, in the respective limits of ΔX and ΔY in the point patterns.

The following table III gives, for E=L=8, examples of the skeleton patterns defined in the form of matrixes of bits equal to 0 or 1 (cf the matrix memories 110 of FIG. 12). For 0, signal VS is zero and for 1 it is equal to a stored value (cf memories 120$_1$ ... 120$_n$ of FIG. 12).

TABLE III

| 0 | 1 | 2 | 3 |
|---|---|---|---|
| 10001000 | 10101010 | 10101010 | 10101010 |
| 00000000 | 00000000 | 01000100 | 01010101 |
| 00000000 | 00100010 | 10101010 | 10101010 |
| 00000000 | 00000000 | 00000000 | 00010001 |
| 10001000 | 10101010 | 10101010 | 10101010 |
| 00000000 | 00000000 | 01000100 | 01010101 |
| 00000000 | 00100010 | 10101010 | 10101010 |
| 00000000 | 00000000 | 00000000 | 00010001 |

| 4 | 5 | 6 | 7 |
|---|---|---|---|
| 11101110 | 11111111 | 11111111 | 11111111 |
| 01010101 | 01010101 | 11011101 | 11111111 |
| 10101010 | 10111011 | 11111111 | 11111111 |
| 01010101 | 01010101 | 01010101 | 01110111 |
| 11101110 | 11111111 | 11111111 | 11111111 |
| 01010101 | 01010101 | 11011101 | 11111111 |
| 10101010 | 10111011 | 11111111 | 11111111 |
| 01010101 | 01010101 | 01010101 | 01110111 |

Table IV gives two examples of true patterns formed from coloured patterns, the first of two-coloured, overlapping squares and the second of a triangle on a coloured background.

TABLE IV

| 0 | 1 |
|---|---|
| 33333333 | 11166111 |
| 33333333 | 11166111 |
| 33555533 | 11666611 |
| 33555533 | 11666611 |
| 33555533 | 16666661 |
| 33555533 | 16666661 |

TABLE IV-continued

| 0 | 1 |
|---|---|
| 33333333 | 66666666 |
| 33333333 | 66666666 |

Table V gives the correspondence between the values of the elements of table IV and the primary colours R, G and B.

TABLE V

| V | R | G | B | Shade |
|---|---|---|---|---|
| 0 | 0 | 0 | 0 | Black |
| 1 | 0 | 0 | 1 | Blue |
| 2 | 0 | 1 | 0 | Green |
| 3 | 0 | 1 | 1 | Cyan |
| 4 | 1 | 0 | 0 | Red |
| 5 | 1 | 0 | 1 | Magenta |
| 6 | 1 | 1 | 0 | Yellow |
| 7 | 1 | 1 | 1 | White |

Figure 16A:
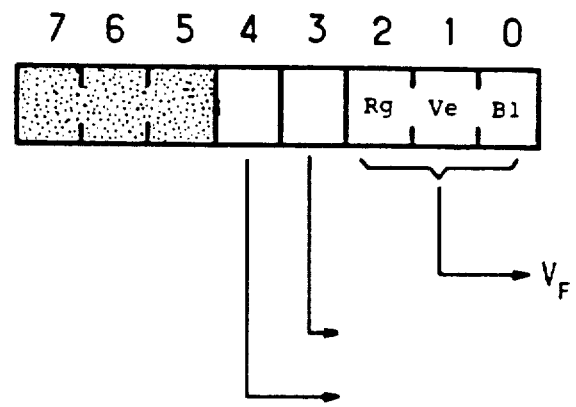
FIG. 16a the structure of the digital words defining the operating mode and the mesh used.
Figure 16A:
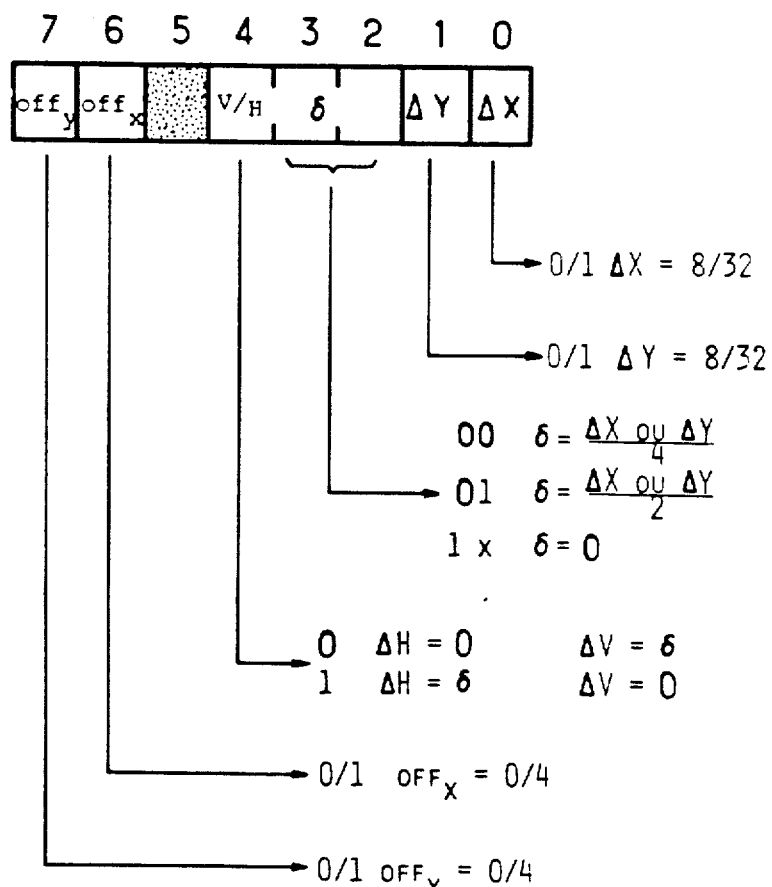
Figure 16:
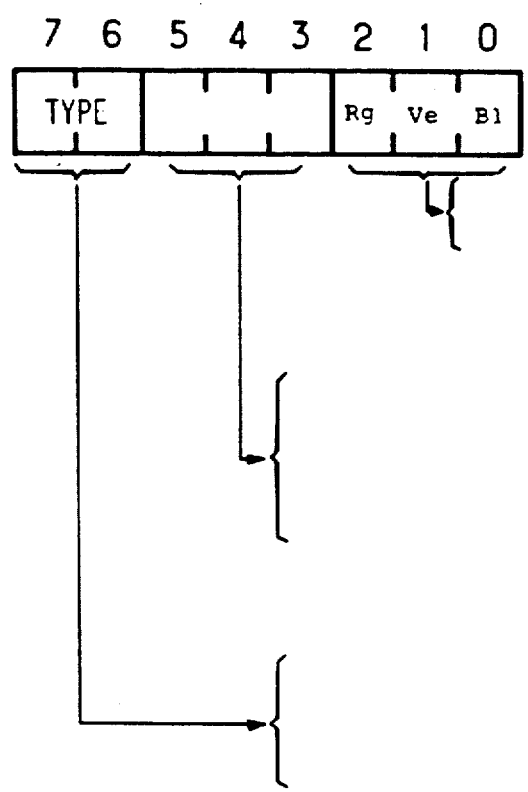
FIG. 16b the structure of the digital words defining the pattern and the special signals DIME and DIML.
Figure 16:
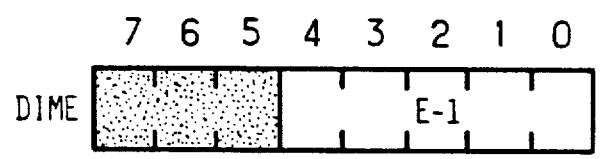
Figure 16:
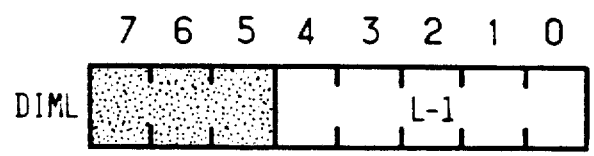

A description will now be given of the structure of the signal supplied by microcomputer 10 to system 30 according to the invention, in order to define its operating methods. There are five bytes described in FIGS. 16a and 16b, which are as follows:

- a MODE byte (top of FIG. 16a), defining the two operating modes normal/pattern and transparent/uniform and also gives the value V$_F$ used in the normal mode and in the uniform mode, the mode being fixed by the bit of rank 4, the background by the bit of rank 3 and V$_F$ by the least three significant bits;

- a MESH byte (bottom of FIG. 16a), which defines the values ΔX, (bit 0), αY (bit 1), ΔH and ΔV (bits 2, 3, 4), off$_x$ (bit 6), off$_y$ (bit 7);

- a PATTERN byte (top of FIG. 16b), which defines by its two most significant bits, the type of pattern (00=point pattern, 01=skeleton pattern, 11 or 10=true pattern), the bits 3, 4 and 5 determining for the skeleton pattern one of the 8 available patterns (from 000 to 111) and for the true pattern, one of the two patterns available depending on whether bit 5 is equal to 0 or to 1, bits 0, 1 and 2 determining one out of 8 values for Vp or one out of 8 values for Vs;

- a DIME byte (centre of FIG. 16b), which gives by its five least significant bits the value of E-1 for the point pattern;

- a DIML byte (bottom of FIG. 16b), which gives by its five least significant bits the value of L-1 for the point pattern.

Figure 17:
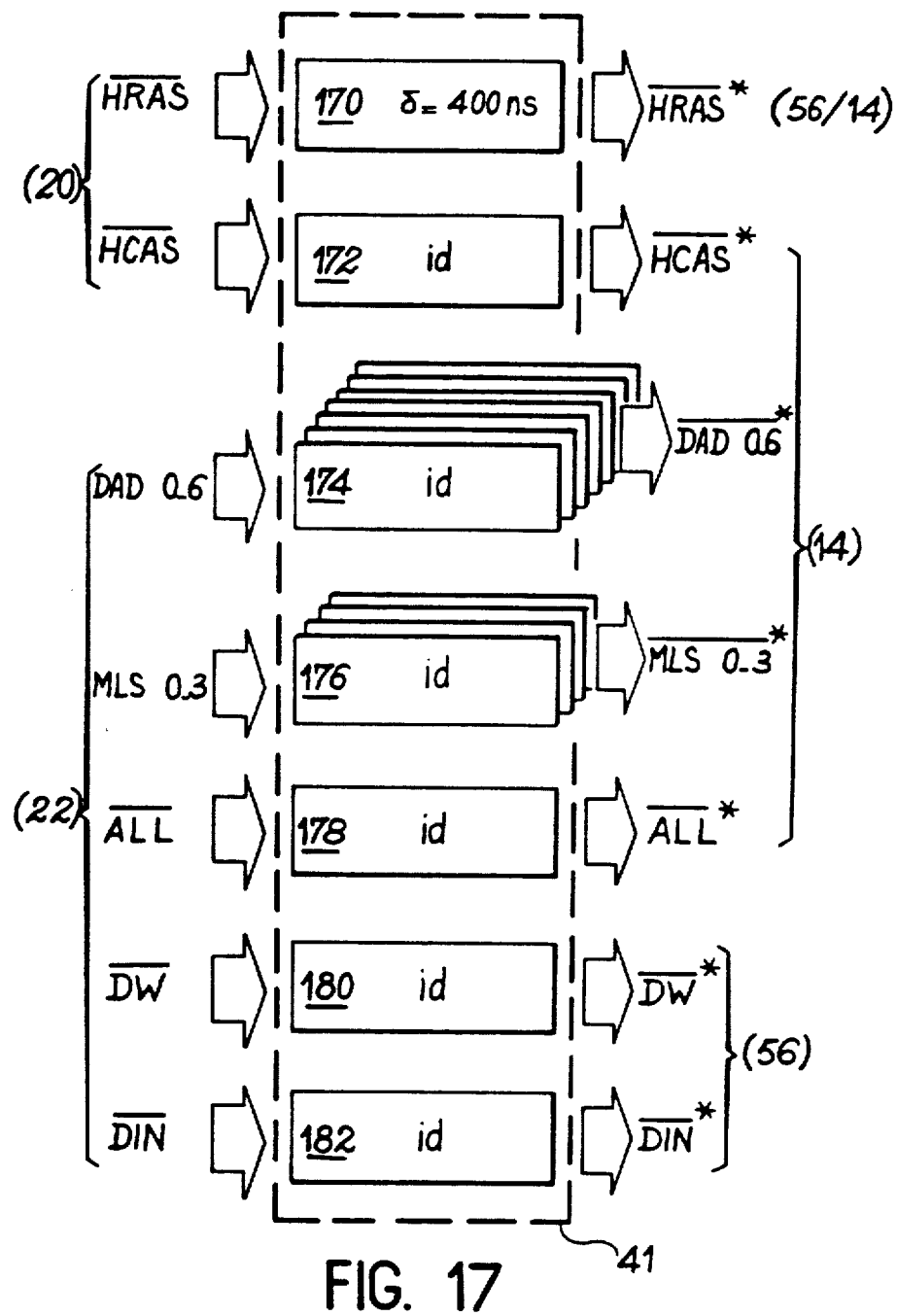
FIG. 17 a special embodiment of the memory cycle transmission circuit.

The memory cycle transmission circuit 41 is illustrated in FIG. 17 and comprises 16 delay lines (e.g. of type DDU-3J-5500, supplying a delay of 400 ns), respectively 170, 172, 174 (6 grouped lines), 176 (4 grouped lined), 178, 180 and 182.

The address signals DAD 0-6, MSL 0-3 and control signals $\overline{ALL}$, $\overline{DW}$, $\overline{DIN}$ from GDP 22 on the one hand and $\overline{HRAS}$ and $\overline{HCAS}$ from the sequencer 20 on the other hand are delayed by the same amount of time by said lines (in the present case 400 ns), The thus obtained 14 delayed signals $\overline{DAD}$ 0-6*, $\overline{MSL}$ 0-3* and $\overline{ALL}$* are transmitted to memory 14. The start of cycle Dcy*, pen (P1*) and writing (Ec*) signals (cf FIGS. 10 and 13) intended for circuit 56 are respectively constituted by signals $\overline{HRAS}$*, $\overline{DIN}$* and $\overline{DW}$*.

Figure 18:
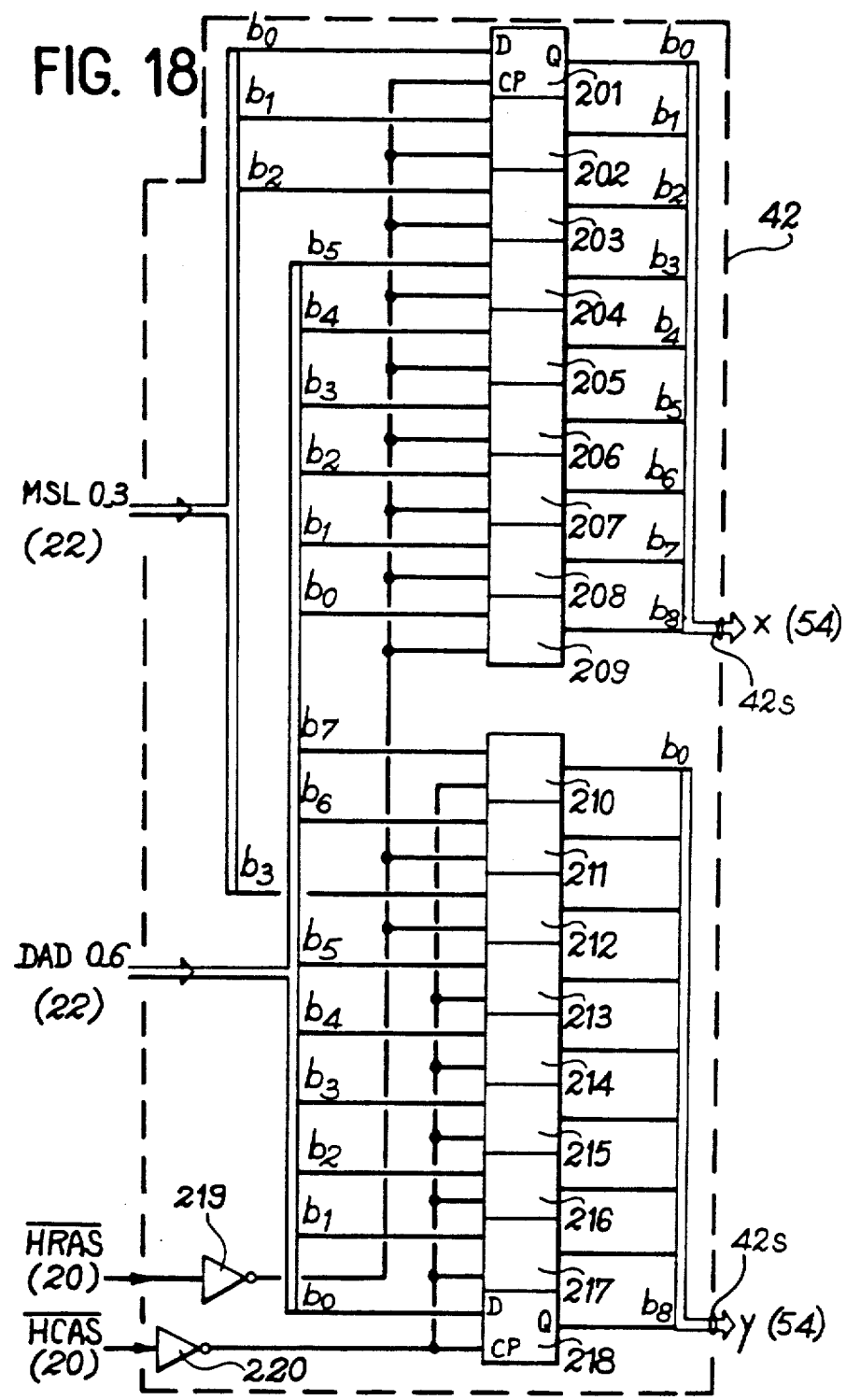
FIG. 18 a special embodiment of the circuit for shaping coordinates x and y.

An embodiment of the shaping circuit 42 of x, y is shown in FIG. 18 and comprises 18 type 74S175 D flip-flops respectively 201 to 218 and two inverters 219, 220. Each flip-flop has two inputs D and CP and an output Q. The inputs D receive the address signals MSL 0-3 and DAD 0-6 from the GDP 22 and the inputs Q the signals $\overline{HRAS}$ and $\overline{HCAS}$ applied across inverters 219, 220. Thus, the address signals are sampled as soon as they are transmitted by the GDP. The aforementioned table II fixes the correspondence between signals MSL and DAD on the one hand and the bits of coordinates x and y on the other. Following the descending transition of $\overline{HCAS}$, the two values c and y are available on outputs 42s.

Figure 19A:
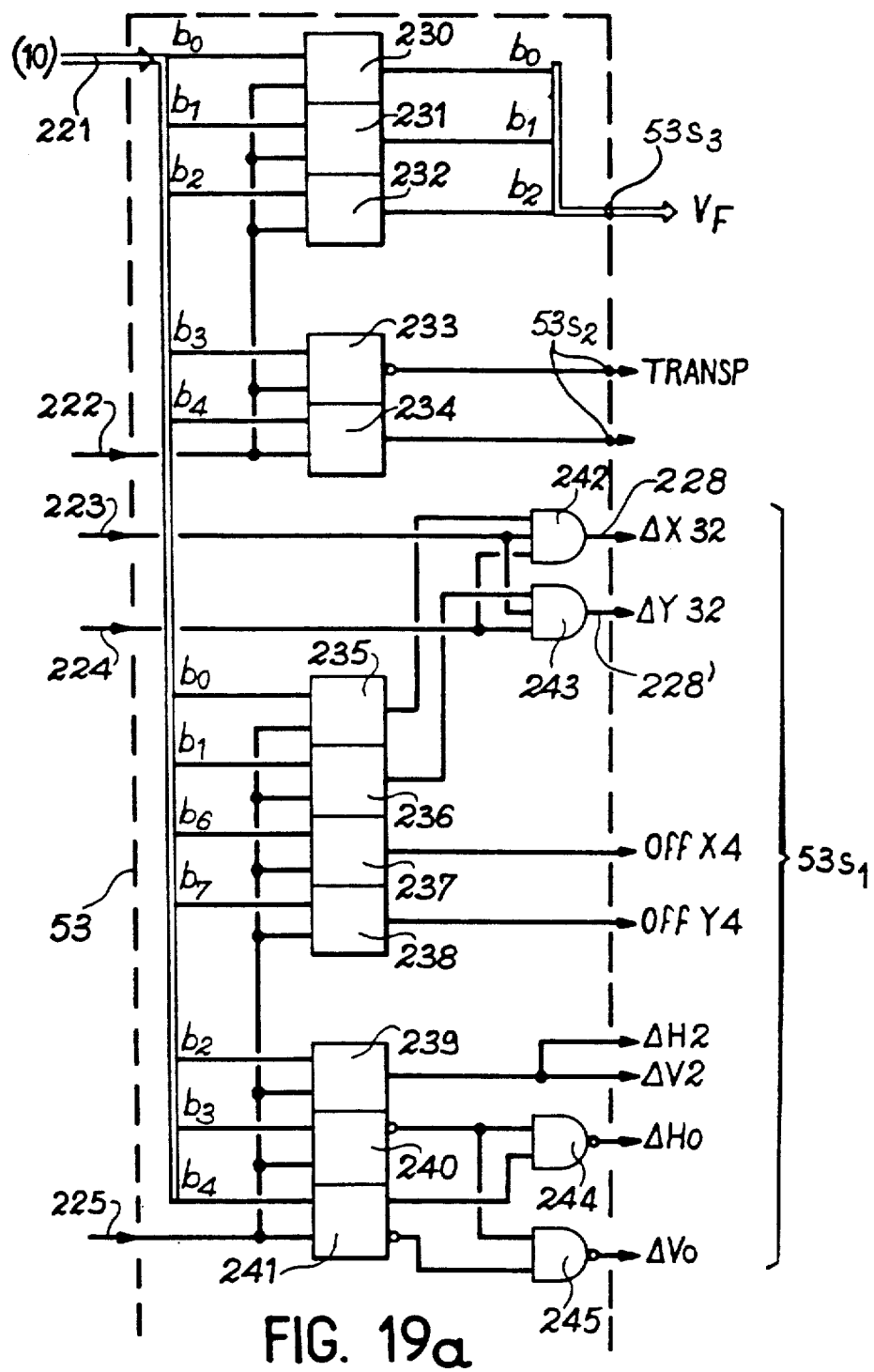
FIGS. 19a and 19b a special embodiment of the construction of the operation parametrization circuit.
Figure 19B:
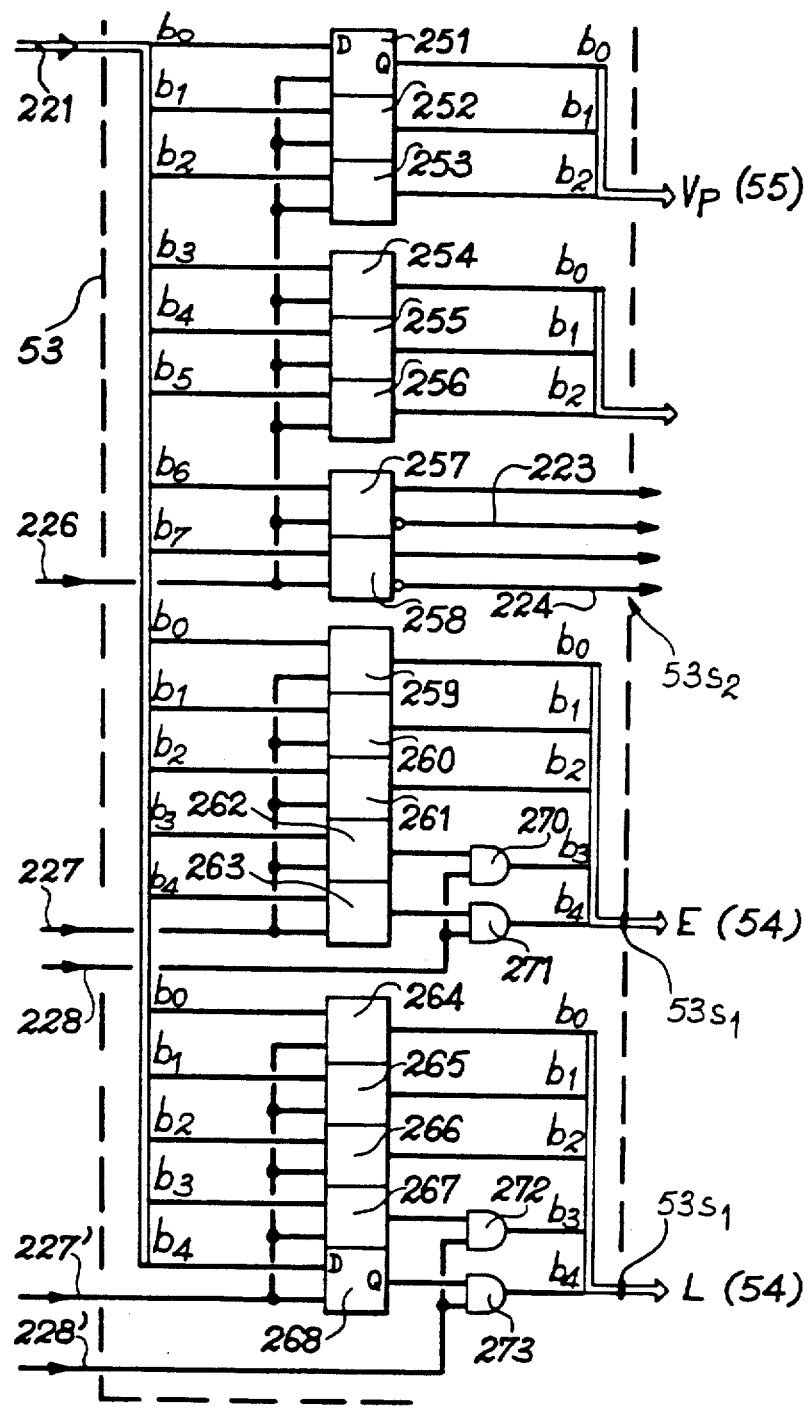

An embodiment of the operation parametrization circuit 53 is shown in FIGS 19a and 19b.

The part shown in FIGS. 19a comprises 12 D-type flip-flops (74LS175), designated 230 to 241, two AND gates of type 74LS11, designated respectively 242 and 243 and two NAND gates of type 7400, designated respectively 244 and 245. A data bus 221, from microcomputer 10, supplies the flip-flops with bits defining the different operating characteristics defined by the aforementioned bytes. Connection 222 controls the MODE byte loading and connection 225 the MESH byte loading. The two connections 223, 224, which are respectively the patternQ/ output of 257 and the patternR/ output of 258 validate each of the two outputs 235, 236 for respectively obtaining ΔX32 by gate 242 and ΔY 32 by gate 243.

The parts shown in FIG. 19b comprises 18 type D flip-flops (74LS175), designated 251 to 268 and four AND gates (type 7408), designated 270 to 273. These flip-flops and gates are supplied by the data bus 221 and by the connections 226 for loading the PATTERN byte, 227 for loading the DIME byte, 227' for loading the DIML byte, 228 and 228' respectively being the validations of the two most significant bits of E and L, i.e. the outputs of 262 and 263 for 228 and the outputs of 267 and 268 for 228'.

The different outputs of the circuit of FIGS. 19a and 19b supply the following signals:

| output of 234: | PATTERN = 0 normal mode,<br>= 1 pattern mode |
|---|---|
| output of 233: | TRANSP = 0 uniform background<br>= 1 transparent background |
| outputs of 230, 231, 232: | $V_F$ = 3 bits of arbitrary value V |
| output of 242: | Δ32 = 0 ΔX = 8<br>= 1 ΔX = 32 |
| output of 243: | ΔY32 = 0 ΔY = 8<br>= 1 ΔY = 32 |
| output of 237: | offX4=0 off$_x$=0<br>=1 off$_x$=4 |
| output of 238: | offY4=0 off$_y$=0<br>=1 off$_y$=4 |
| output of 239: | ΔH2=0 ΔH= $\frac{\Delta X}{4}$<br>=1 ΔH= $\frac{\Delta X}{2}$ |
| output of 239: | ΔV2=0 ΔV = $\frac{\Delta Y}{4}$<br>=1 ΔV = $\frac{\Delta Y}{2}$ |
| output of 244: | ΔH0=0 ΔH≠0, ΔH2 is valid,<br>=1 ΔH=0, ΔH2 is without significance |
| output of 245: | ΔV0=0 ΔV≠0, ΔV2 is valid,<br>=1 ΔV=0, ΔV2 is without significance |

| | -continued |
|---|---|
| outputs of 251, 252, 253: | $V_P$=3 bits, value V of the point pattern or value VS1 of the skeleton patterns. |
| outputs of 254, 255, 256: | Pattern No. 3 bits: for skeleton pattern and true pattern (in the latter case the most significant bit is the only useful bit). |
| output of 257: | pattern-SQ=1 skeleton-type pattern |
| output of 258: | pattern-VR=1 true-type pattern |
| outputs of 259, 260, 261, 270 and 271: | E, 5 bits, length of pattern less 1 modulo ΔX. |
| outputs of 264, 265, 266, 272 and 273: | L, 5 bits, height of pattern less 1, modulo ΔY. |

It should be noted that $\Delta HO + \Delta VO = 1$ and that if the signals PATTERN-SQ (SQ=abbreviation for skeleton) and PATTERN-VR (VR=abbreviation for true pattern) are both zero, then it is a point pattern.

FIGS. 20a to 20d illustrate a special embodiment of the circuit 54 for calculating α and β. The design is based on combinatory logic and the circuit carries out the calculations corresponding to relations (1), (2) and (4) and (18'), (2') and (3') given hereinbefore, on the basis of values x and y supplied by circuit 42 according to the mesh defined by circuit 53 with the aid of ΔX, ΔY, ΔH, ΔV, off$_x$ and off$_y$.

Figure 20A:
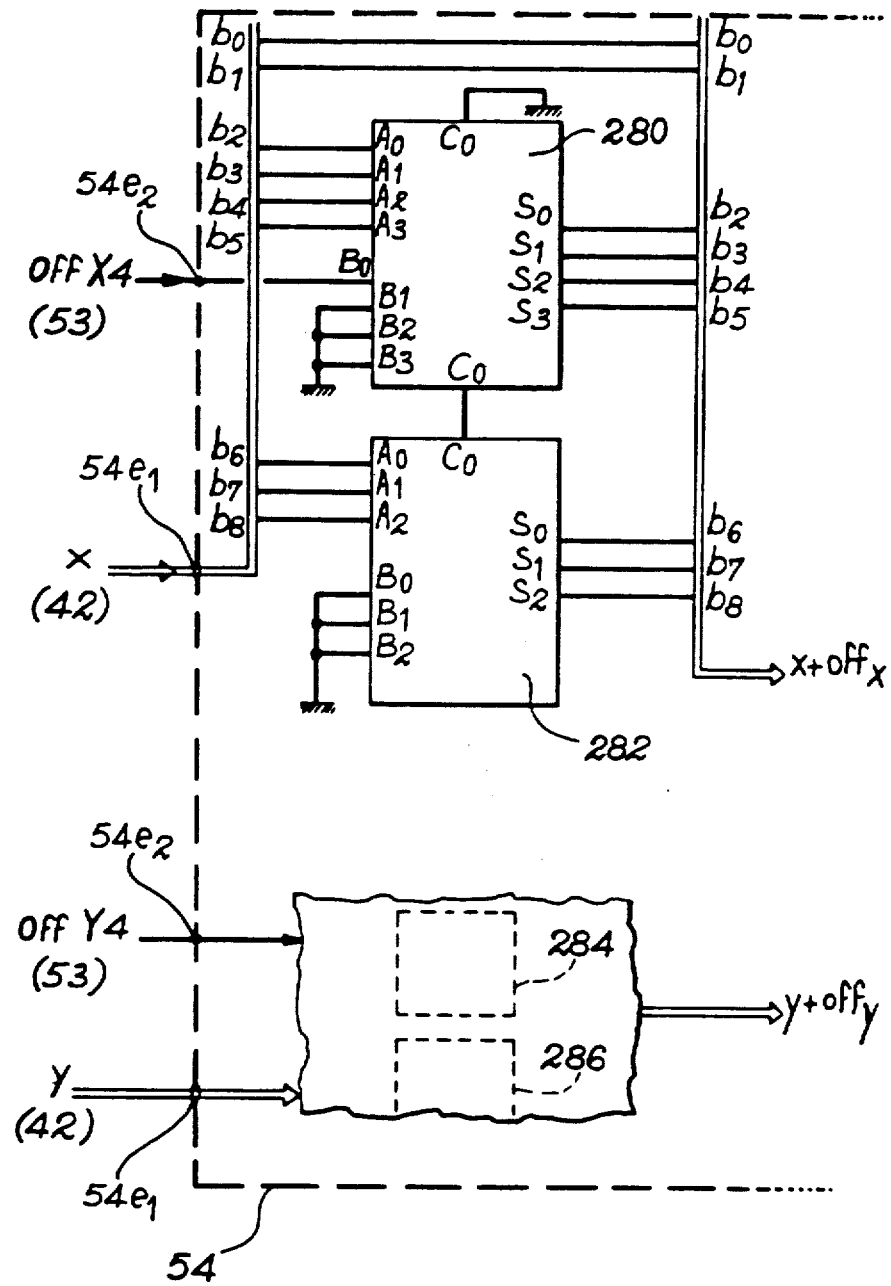
FIGS. 20a, 20b, 20c, 20d illustrate a special mode of the circuit for calculating coordinates $\alpha$ and $\beta$.
Figure 20:
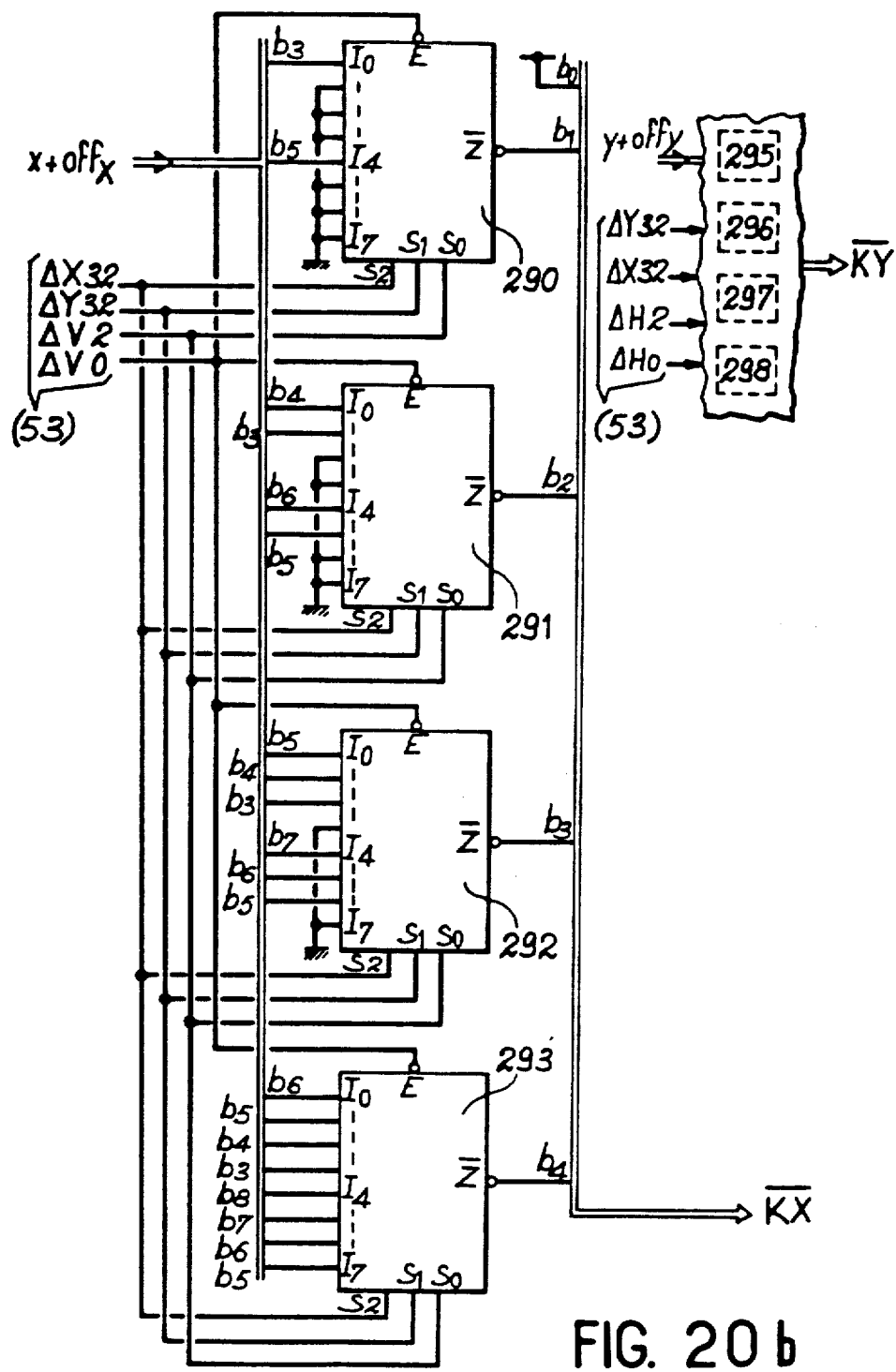

The circuit of FIG. 20a comprises two adders 280, 282, e.g. of type 74283, receiving offx4 (from 237, FIG. 19a) and x and two adders 284, 286 receiving offY4 (from 238, FIG. 19a) and y and it supplies x+off$_x$ and y+off$_y$.

The circuit of FIG. 20b comprises a first group of 4 multiplexers 290 to 293 and a second identical group of 4 other multiplexers 295 to 298 (diagrammatically shown at the top right), (all these circuits being e.g. of type 74S151). They have three control inputs $S_0$, $S_1$ and $S_2$. The first group of multiplexers receives Δx+off$_x$ from circuits 280, 282 of FIG. 20a, as well as ΔX32, ΔY32, ΔV2, ΔVO from gates 242, 243 of flip-flop 239 and gate 245 of circuit 53 (FIG. 19a). Identically, the second group receives y+off$_y$ and ΔY32, ΔX32, ΔH2, ΔHO.

The two circuits of FIG. 20b respectively supply signals $\overline{KX}$ and $\overline{KY}$ with $$KX = \frac{x + \text{offx}}{\Delta X} \text{ and } Ky = \frac{y + \text{offy}}{\Delta Y}.$$

Figure 20C:
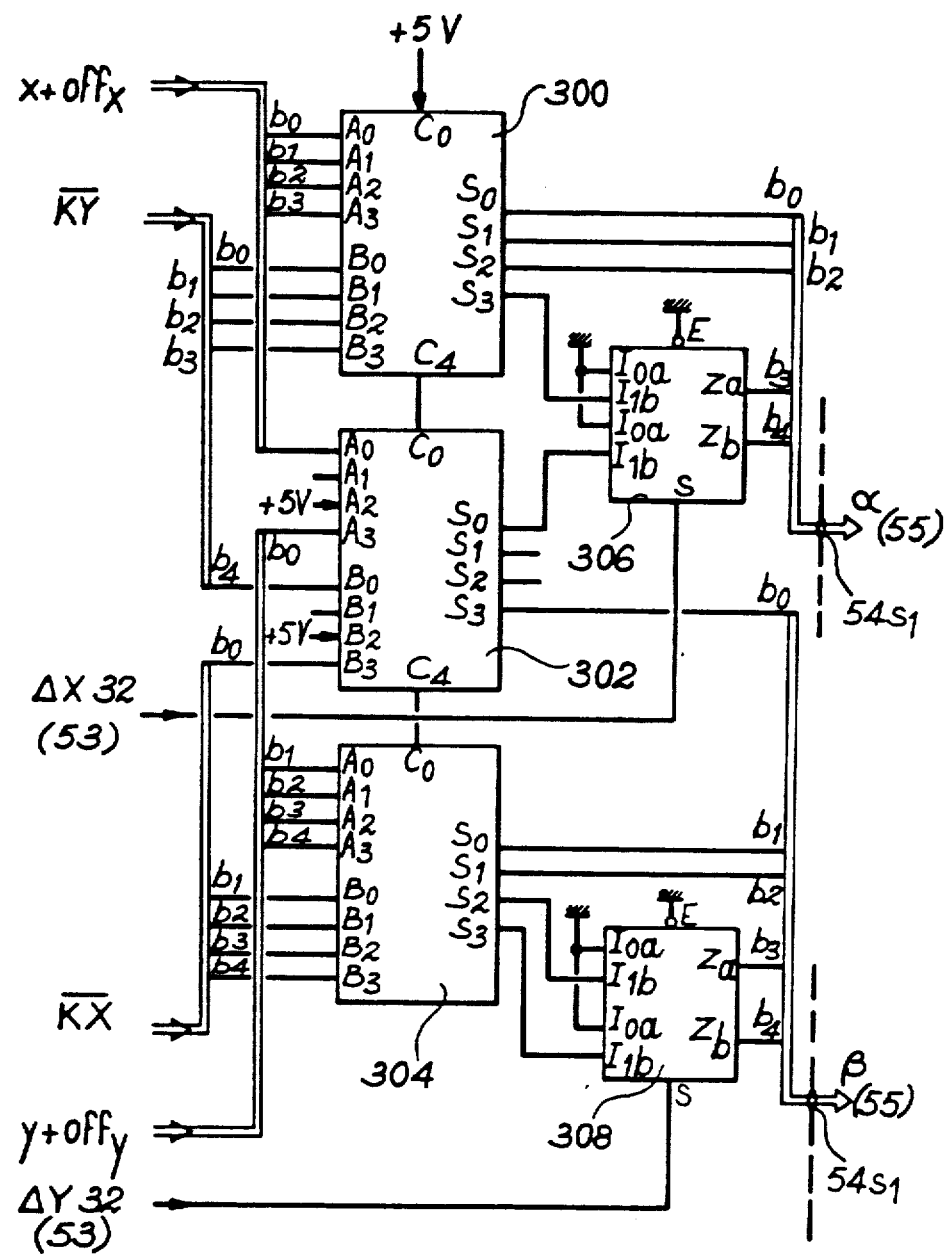

The circuit of FIG. 20c has three adders 300, 302, 304, e.g. of type 74283, which receive $\overline{KX}$ and $\overline{KY}$ from the circuit of FIGS. 20b, as well as x+off$_x$ and y+off$_y$ from the circuits of FIG. 20a. The circuit of FIG. 20c then comprises two circuits 206, 280, of type 74157, used for carrying out the modulo operation (ΔX or ΔY) and receiving ΔX32 and ΔY32 from circuit 53 (FIG. 19a). The system supplies coordinates α and β on outputs 54$s_1$, which are applied to circuit 55.

Figure 20D:
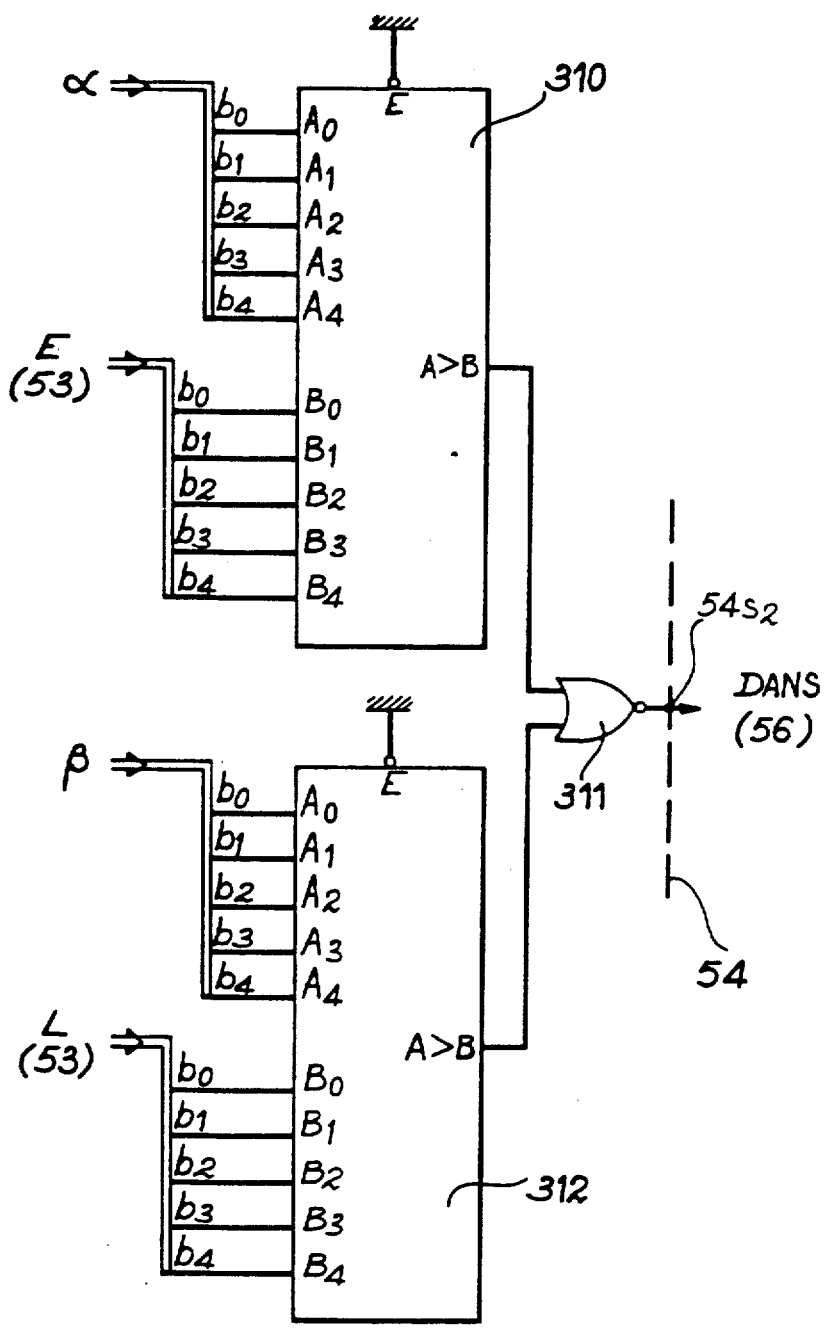

Finally, the circuit illustrated in FIG. 20d has two comparators 310, 312 of type 9324, receiving α and E in the first case and β and L in the second. A NOR gate 311, of type 74S02, supplies the DANS signal.

As indicated hereinbefore in connection with the significance of choosing the parameters of the pattern which are powers of 2, the divisions by ΔX or ΔY followed by the product of ΔH and ΔV for calculating the quantities of $$\frac{x + \text{off}_x}{\Delta X} \cdot \Delta V \text{ or } \frac{y + \text{off}_y}{\Delta Y},$$

are realised in the circuits of FIGS. 20a to 20d by static displacements. The different combinations ($\Delta X$, $\Delta V$) and ($\Delta Y$, $\Delta H$) are processed by the multiplexers 290 to 293 of the FIG. 20b, which are of type 8→1 and whose control signals are ($\Delta X32$, $\Delta V2$, $\Delta Y32$) and ($\Delta Y32$, $\Delta H2$, $\Delta X32$). The following table VI gives the bits supplied for the quantities in question, as a function of the signals applied to the input $S_2$, $S_1$, $S_0$ of the multiplexers.

TABLE VI

| $S_2$: $\Delta X32$ /$\Delta Y32$ | $S_1$: $\Delta Y32$ /$\Delta X32$ | $S_0$: $\Delta V2$ /$\Delta H2$ | $\frac{x+\text{off}_x}{\Delta X} \cdot \Delta V$ | | | | $\frac{y+\text{off}_y}{\Delta Y} \cdot \Delta H$ |
|---|---|---|---|---|---|---|---|
| 0 | 0 | 0 | b5 | b5 | b4 | b3 | 0 |
| 0 | 0 | 1 | b5 | b4 | b3 | 0 | 0 |
| 0 | 1 | 0 | b4 | b3 | 0 | 0 | 0 |
| 0 | 1 | 1 | b3 | 0 | 0 | 0 | 0 |
| 1 | 0 | 0 | b8 | b7 | b6 | b5 | 0 |
| 1 | 0 | 1 | b7 | b6 | b5 | 0 | 0 |
| 1 | 1 | 0 | b6 | b5 | 0 | 0 | 0 |
| 1 | 1 | 1 | b5 | 0 | 0 | 0 | 0 |

Signals $\Delta H_0$ and $\Delta V_0$ correspond to the case in which $\Delta H = 0$ and $\Delta V = 0$. These signals are applied to the inputs E of the multiplexers and force their outputs to 1. The subtraction of $$\frac{x + \text{off}_x}{\Delta X} \cdot \Delta V$$

from $y + \text{off}_y$ (relation 1') is carried out by the addition of the complement to 2 of this value, the same applying regarding the subtraction of $$\frac{y + \text{off}_y}{\Delta Y} \cdot \Delta H$$

from $x + \text{off}_x$ (relation 1). Only the five least significant bits are processed, because the more significant bits are truncated by the downstream modulo function. This modulo $\Delta X$ or modulo $\Delta Y$ function consists of only retaining the three least significant bits of the result if $\Delta X$ or $\Delta Y$ is equal to 8, or the five least significant bits if $\Delta X$ or $\Delta Y$ is equal to 32.

Figure 21:
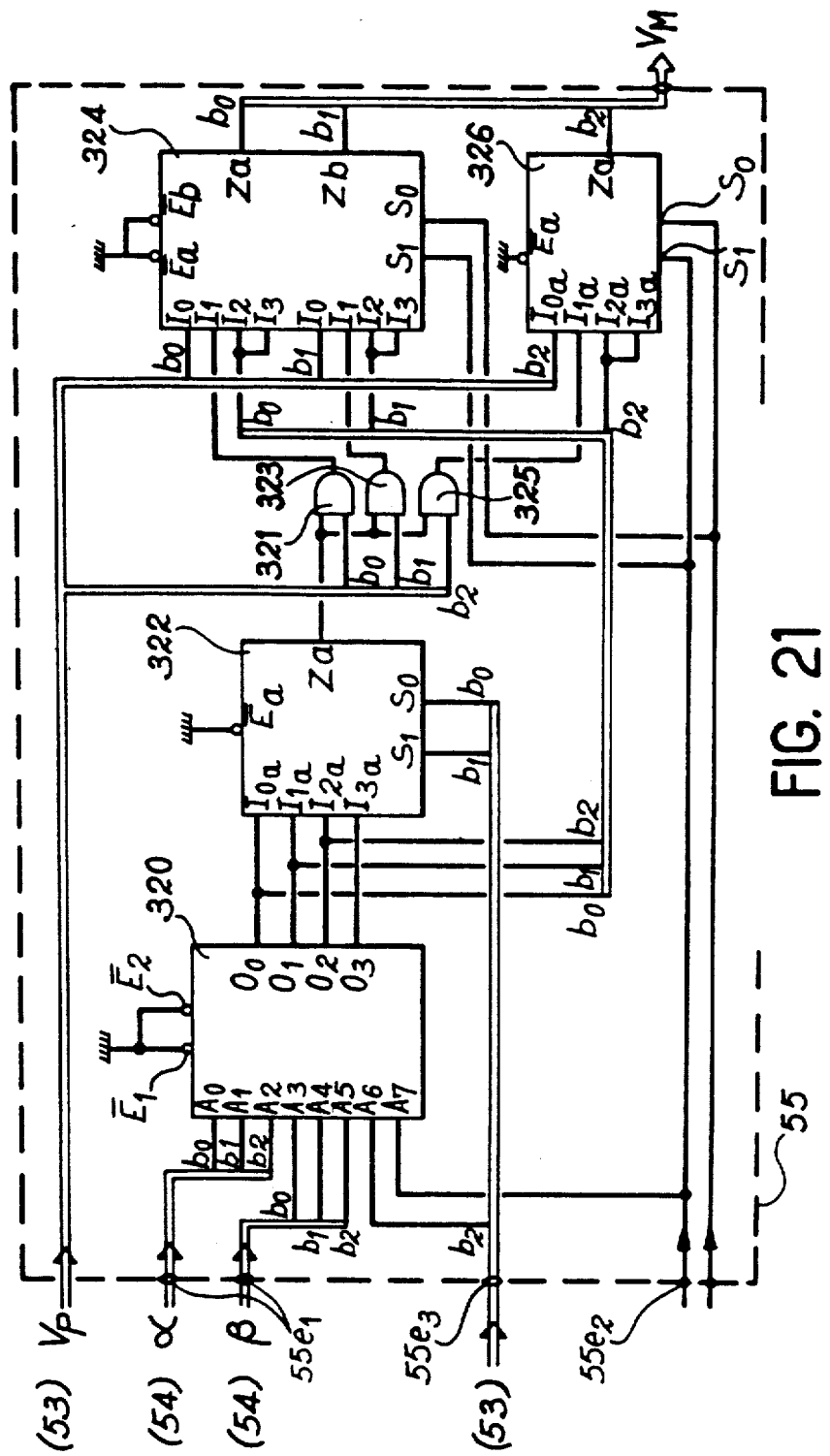
FIG. 21 an embodiment of the pattern memory circuit.

A special embodiment of the pattern memory circuit 55 is shown in FIG. 21. It comprises a read-only memory 320, e.g. of type 6301, thee multiplexers 322, 324 and 326, three logic AND gates 321, 323, 325, e.g. of type 74S08.

Circuit 55 receives the signal Vp from circuit 53, coordinates $\alpha$ and $\beta$ coming from circuit 54, the pattern number on input $55_3$ and the signals PATTERN-VR and PATTERN-SQ from 53. It supplies the value $V_M$ associated with point $\alpha$, $\beta$ for the considered pattern.

In the case of the use of a point pattern signal Vp supplied by the parametrization circuit 53 is supplied directly to the inputs $I_0$ of output multiplexers 324 and 326.

In the case of a skeleton pattern, multiplexers 324 and 326 receive on inputs $I_1$, the value Vp validated by the address element ($\alpha,\beta$) across the AND gates.

In the case of a true pattern, the value of the element to be written is transmitted to the inputs $I_2$ and $I_3$ of the final multiplexers 324 and 326.

The eight skeleton patterns and the two true patterns are stored in memory 320 with addresses $A_0$ to $A_7$ in accordance with the following table VII:

TABLE VII

| $A_7$ | $A_6$ | $A_5$ | $A_4$ | $A_3$ | $A_2$ | $A_1$ | $A_0$ | |
|---|---|---|---|---|---|---|---|---|
| 0 | 0 | | $\beta$ | | | | $\alpha$ | skeleton patterns 0 to 3 |
| 0 | 1 | | $\beta$ | | | | $\alpha$ | skeleton patterns 4 to 7 |
| 1 | 0 | | $\beta$ | | | | $\alpha$ | true pattern 0 |
| 1 | 1 | | $\beta$ | | | | $\alpha$ | true pattern 1 |

With regards to the number of the pattern applied to input $55e_3$ and coded on three bits ($b_0,b_1,b_2$) (cf FIG. 16b), bit $b_2$ is applied to input $A_6$ of memory 320 and bits $b_0$ and $b_1$ to inputs $S_0$, $S_1$ of multiplexer 322, which is of type 4→1.

For the skeleton patterns, the bit $b_2$ applied to input $A_6$ of 320 selects one group from among 2 of 4 skeleton patterns: skeleton patterns 0, 1, 2, 3 5 or skeleton patterns 4, 5, 6, 7. The correspondence between the patterns and the outputs $0_0$, $0_1$, $0_2$, $0_3$ of memory 320 is indicated in the following table VIII:

TABLE VIII

| $b_2$ | $0_3$ | $0_2$ | $0_1$ | $0_0$ |
|---|---|---|---|---|
| =0 | pattern 3 | pattern 2 | pattern 1 | pattern 0 |
| =1 | pattern 7 | pattern 6 | pattern 5 | pattern 4 |

One of the four patterns in a group is definitively selected by multiplexer 322, controlled by bits $b_0$ and $b_1$.

For the true patterns, input $A_7$ of the memory is used and its three outputs $o_0$ (for blue), $0_1$ (for green), and $0_2$ (for red) are the only ones taken into account ($0_3$ being ignored).

Figure 22:
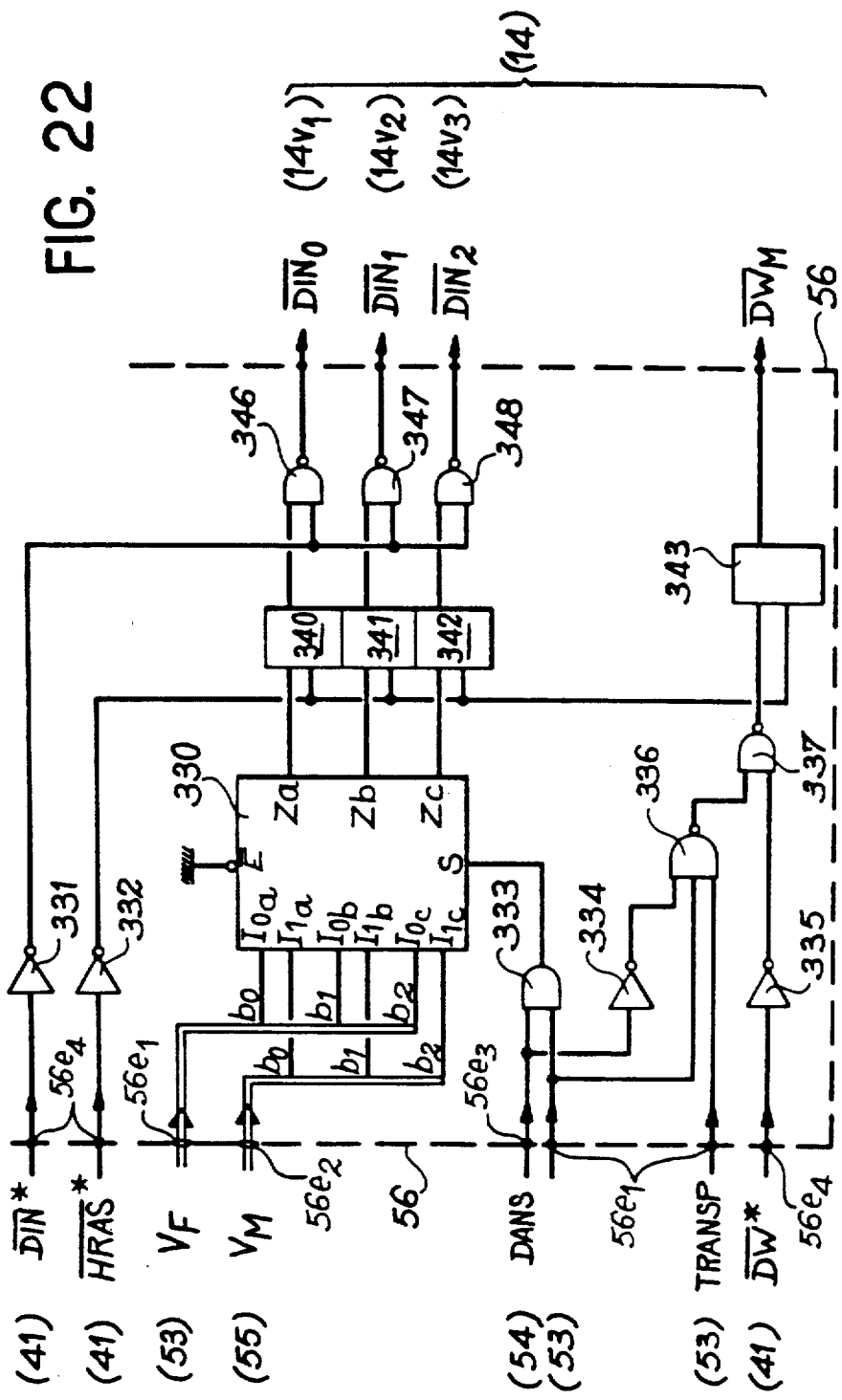
FIG. 22 an embodiment of the configuration selection circuit.

A special embodiment of the configuration selection circuit 56 is illustrated in FIG. 22. It comprises a multiplexer 330, e.g. of type 74S175, receiving $V_F$ and $V_M$, four flip-flops 340 to 343, of type 74S175, inverters 331, 332, 334, 335, of type 74S04, an AND gate 333, of type 74S08, a NAND gate 336, of type 74S00, a NOR gate 337 of type 74S00, and three output NAND gates 346, 347, 348, of type 74S00. This circuit selects the final value V and blocks the writing into the image memory in accordance with the aforementioned table I.

More specifically, the multiplexer 330 receives $V_F$ and $V_M$ respectively from the parametrization circuit 53 and the pattern memory circuit 55 and is controlled by the control signal DANS-ET-MOTIF, which validates $V_M$. The selected value is then stored by the complement signal of $\overline{\text{HRAS}}^*$ in flip-flops 340, 341, 342. The output of these flip-flops is validated by the complement of $\overline{\text{DIN}}^*$ due to gates 346, 347, 348. The three output signals $\overline{\text{DIN}}_0$, $\overline{\text{DIN}}_1$ and $\overline{\text{DIN}}_2$ are transmitted to the validation inputs $14V_1$, $14V_2$, $14V_3$ of the three image memory planes.

The second part of circuit 56 processes a writing signal $\overline{\text{DW}}_M$ intended for the image memory, in accordance with the following logic relation:

$$\overline{\text{DW}}_M = \overline{\text{DW}}^* + (\text{MOTIF}.\overline{\text{DANS}}.\text{TRANSP})$$

This writing signal is stored in flip-flop 343 at the same time as the value V selected in flip-flops 340 to 342.

Figure 23:
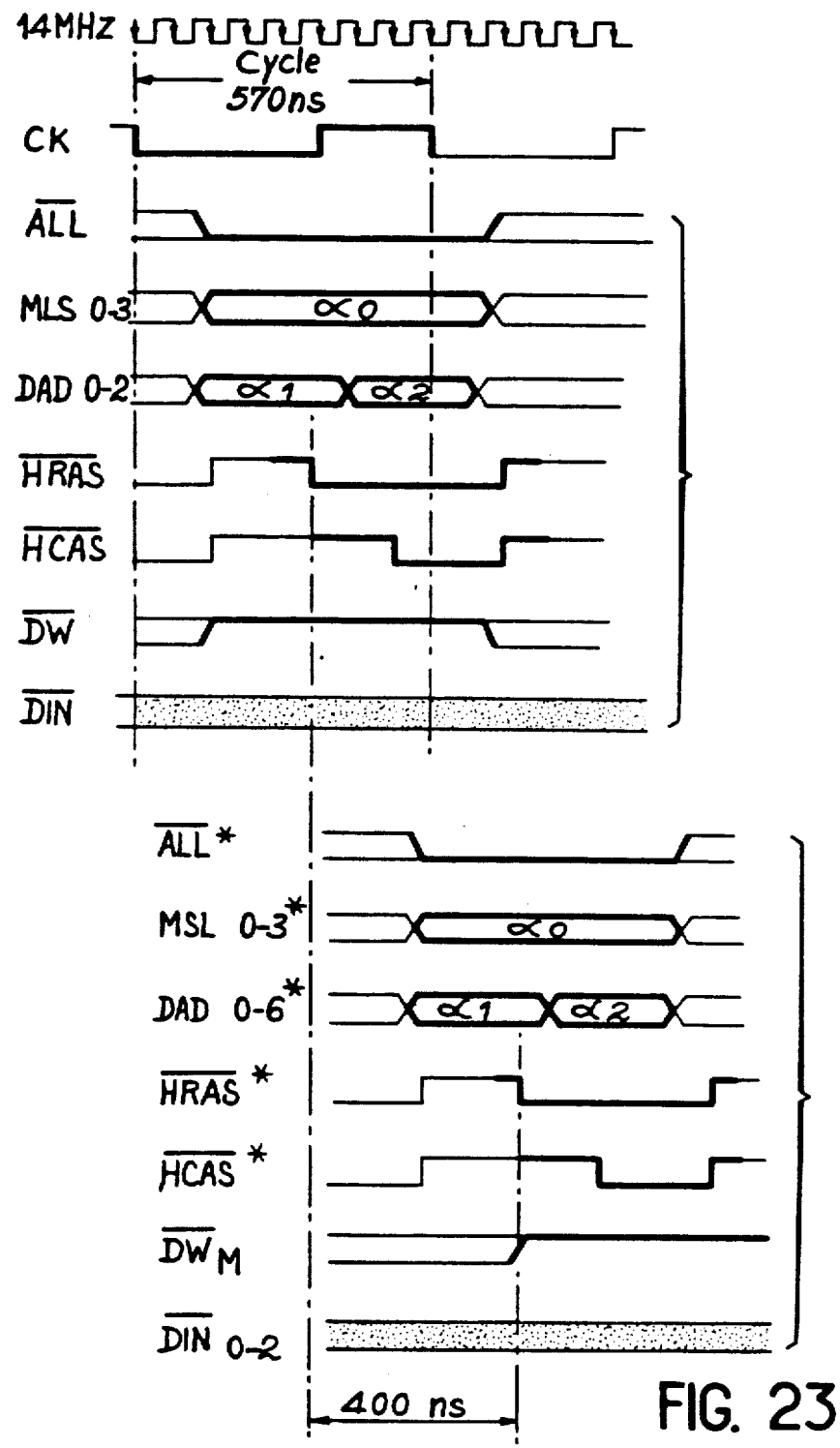
FIG. 23 a chronogram showing the reading and refreshing cycle.
Figure 24:
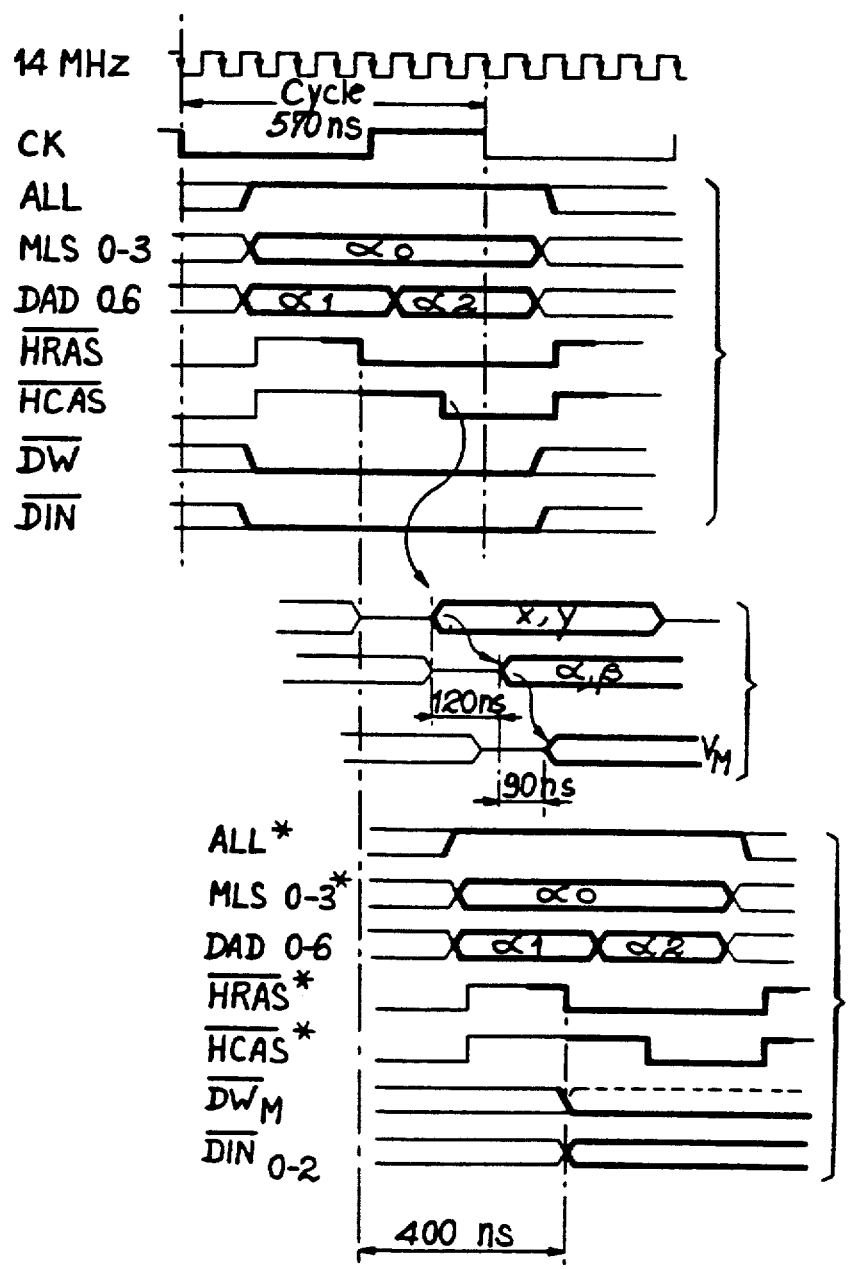
FIG. 24 a chronogram showing the image memory recording cycle.

The chronograms relating to this embodiment are shown in FIGS. 23 and 24. The chronogram of FIG. 23 relates to the reading and refreshing cycles of the image memory. When the GDP starts a reading cycle of the image memory for the video generator, or a dynamic memory refreshing cycle, such a cycle is transmitted as it is to the image memory with a 400 ns time lag. As the latter receives no writing request, it ignores the three signals $\overline{DIN}_0$, $\overline{DIN}_1$, $\overline{DIN}_2$ which, although produced by system 30, are without significance (this is the meaning of the dots of lines $\overline{DIN}$ on the chronogram of FIG. 23). Thus, within such a cycle, system 30 is transparent, with the exception of the time lag.

The chronogram of FIG. 24 relates to the writing cycle. The writing cycle of a point into the image memory, started by the GDP, is characterized by a chronogram identical to that of a reading and refreshing cycle, unless $\overline{DW}=0$, $\overline{ALL}=1$ (access to 1 bit) and $\overline{DIN}$ is significant (0 for an effective trace, 1 for an erasure).

The coordinates (x, y) of the current point are given in the three address blocks $a_0, a_1, a_2$, sampled by $\overline{HRAS}$ and $\overline{HCAS}$, so that they are fixed in the output of the shaping circuit for x, y (42). Thus, the coordinates (x, y) are valid approximately 17 ns after the descent of $\overline{HCAS}$. Signals $a, \beta$ are available approximately 120 ns afterwards and the logic DANS signal approximately 150 ns after the availability of (x, y).

The obtaining of $V_M$ from $(a, \beta)$, at the output of the pattern memory circuit 55 takes longer in the case of a skeleton pattern and in this case requires 90 ns. Thus, the storage in selection circuit 56 of the signal $\overline{DW}$ and $\overline{DIN}_0$ $_{to\ 2}$ by the signal $\overline{HRAS}^*$ can take place 200 ns after the low transition of $\overline{HCAS}$. Bearing in mind the displacement of signals $\overline{HRAS}$ and $\overline{HCAS}$, it can be considered that 400 ns is an acceptable value for the time lag to be imposed on the signals on the memory cycle, before applying them to the image memory.

Figure 25:
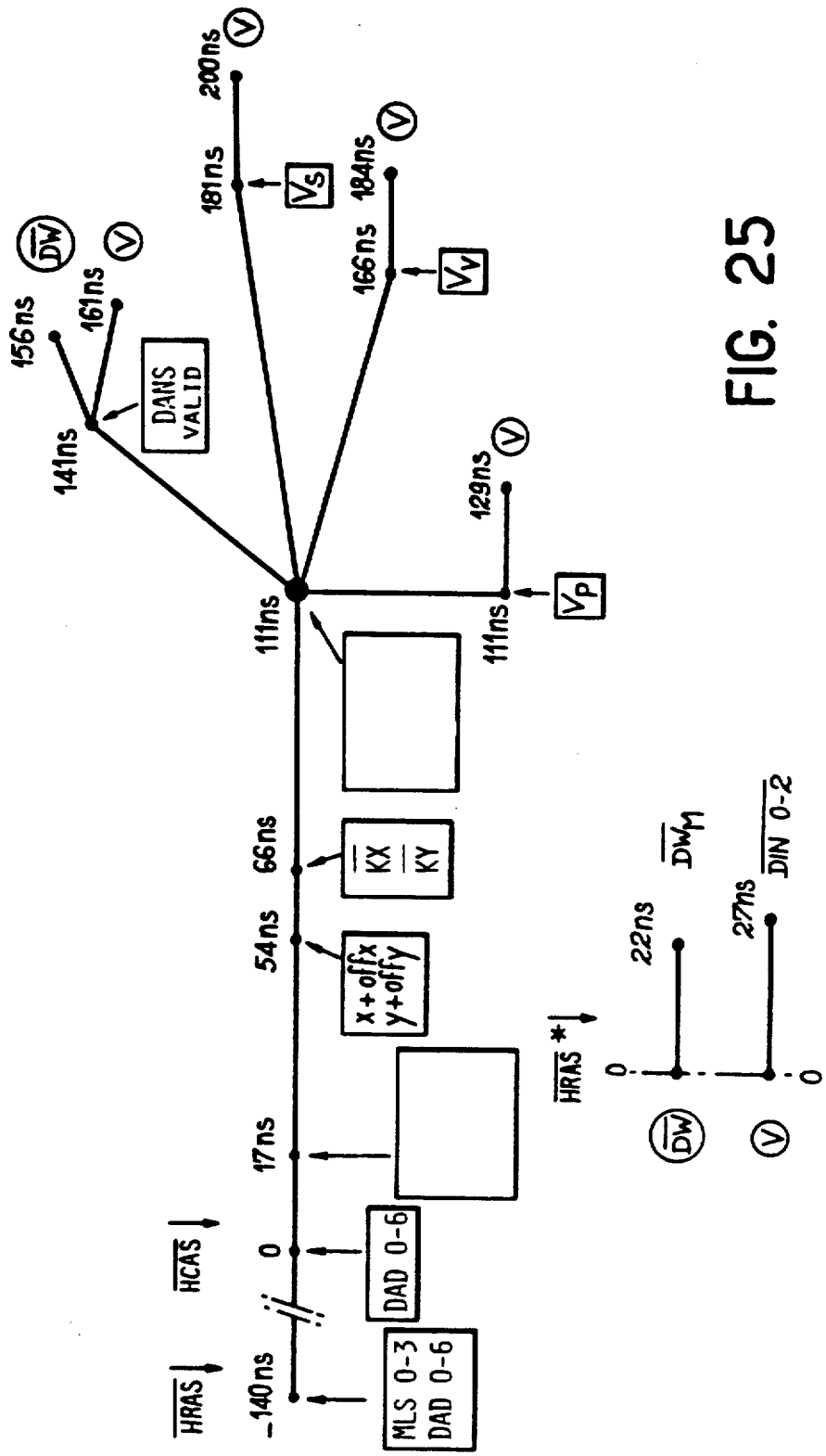
FIG. 25 an internal chronogram.

Finally, FIG. 25 is a chronogram illustrating the internal operation of the system according to the invention and which shows the maximum performance time in the case of skeleton patterns.

The writing cycle as described hereinbefore, relates to the processing of a current point of a given texture. In order to display a texture, the latter must be parametrized by programme. For this purpose, the microcomputer of the terminal loads the five control bytes MODE, MESH, PATTERN, DIME and DIML and then starts the display of the points in said texture.

What is claimed is:

1. An image memory graphic terminal of the type comprising:
   - an image memory (14) constitutes by N memory planes ($14_1 \ldots 14_N$), N being an integer at least equal to 1, each plane incorporating a matrix system of memory points, each able to store one bit, each point being defined by an address, the N bits of N points having the same address in the N planes defining a word V of N bits, said memory having an addressing input (14Ad) common to N planes, a control input (14C) common to N planes, N validation inputs ($14V_1 \ldots 14V_N$) and having N binary outputs ($14S_1 \ldots 14S_N$);
   - a sequencer (20) having a clock output ($20s_1$) and control outputs ($20s_2$);
   - a graphic display processor (22) having an input (22e), a first group of outputs ($22s_1$) associated with the outputs ($20s_2$) of the sequencer supplying control signals (SC) defining an access cycle to the memory, a second group of outputs ($22s_2$) supplying address signals (SAd), a third group of outputs ($22s_3$) supplying clock and synchronization signals;
   - a video signal generator (16) having N binary inputs ($16e_1 \ldots 16e_N$) connected to N binary outputs of the image memory (14), a synchronization input (16e) connected to the third group of outputs ($22s_3$) of the graphic display processor (22) and a clock input (16H) connected to the clock output ($20s_1$) of sequencer (20) and having an output (16s) supplying video and synchronization signals;
   - a video display receiver (18) connected to the video signal generator (16);
   - a management microcomputer (10) having a first group of outputs ($10s_1$) connected to the input (22e) of the graphic display processor and a second group of outputs ($10s_2$), characterized in that the terminal also comprises a system (30) for writing or recording in the image memory image texture signals, said system comprising:
   (A) - a circuit (40) for processing the access cycle to the image memory, said circuit incorporating:
   ($A_1$) - a circuit (41) for the transmission, with a time lag, of the signals for controlling the access cycle to the memory, said circuit having a first input ($41e_1$) connected to the second group of outputs ($20s_2$) of sequencer (20) and ($22s_1$) of the graphic display processor (22) and receiving control signals (SC), a second input ($41e_2$) connected to the second group of outputs ($22s_2$) of the graphic display processor (22) and receiving address signals (SAd), a first output ($41s_1$) supplying control signals delayed by a fixed time (Sc*) and a second output ($41s_2$) supplying address signals delayed by the same time (SAd*), the first output ($31s_1$) being connected to the control inputs ($14C_1 \ldots 14C_N$) of the image memory (14) and the second output ($41s_2$) to the addressing inputs ($14Ad_1 \ldots 14Ad_N$) of said image memory;
   ($A_2$) - a shaping circuit (42), which has an input (42e) connected to the second group of outputs ($22s_2$) of the graphic display processor (22), from where it receives address signals (SAd) and an output (42s) supplying signals (x, y) representing coordinates in the planes of the image memory of the point having the address applied to input (42e);
   (B) - a circuit (50) for the determination of the word (V) to be written into the memory, incorporating:
   ($B_1$) - an operation parametrization circuit (53), which has an input (53e) connected to the second group of outputs ($102_2$) of microcomputer (10) and receiving from the latter signals defining the operating procedures of the system and having a first output ($53s_1$) supplying 8 signals, respectively $\Delta X$, $\Delta Y$, $\Delta H$, $\Delta V$, off$_x$, off$_y$, E, L, defining a repetitive pattern corresponding to a particular image texture, a second output ($53s_2$) supplying signals selecting the pattern to be used in the texture to be displayed, a third output ($53s_3$) supplying signals ($V_F$, modes) defining one operating mode from among several (with or without a pattern, uniform or transparent background);
   ($B_2$) - a computing circuit (54) having a first input ($54e_1$) connected to the output (42s) of the shaping circuit (42) and receiving signals (x, y) and a second input ($54e_2$) connected to the first output ($53s_1$) of the parametrization circuit (53) and receiving the 8 signals supplied by said outputs and having first and second outputs ($54s_1$, $54s_2$), said computing circuit (54) being able to:

- calculate two coordinates $\alpha^*$ and $\beta^*$ from addresses x, y and signals $\Delta X$, $\Delta Y$, $\Delta H$, $\Delta V$, off$_x$, off$_y$ by the following relations:

$$\alpha^* = (x + \text{off}_x) - \frac{(y + \text{off}_y)}{\Delta Y} \Delta H \quad (1)$$

$$\beta^* = (y + \text{off}_y) - \frac{(x + \text{off}_x)}{\Delta X} \Delta V \quad (1')$$

- determine whether $\alpha^*$ is positive or zero, in which case the circuit calculates a relative coordinate $\alpha$ equal to $\alpha^*$ modulo $\Delta X$, if not the circuit calculates $\alpha$ by:

$$[\Delta X - (|\alpha^*| \text{ modulo } \Delta X)] \text{ modulo } \Delta X,$$

in which $|\alpha^*|$ represents the absolute value of $\alpha^*$, determine if $\beta^*$ is positive or zero, in which case the circuit calculates a coordinate $\beta$ equal to $\beta^*$ modulo $\Delta Y$, if not the circuit calculates a relative coordinate $\beta$ by:

$$[\Delta Y - (|\beta^*| \text{ modulo } \Delta Y)] \text{ modulo } \Delta Y$$

in which $|\beta^*|$ represents the absolute value of $\beta^*$, supply at its first output (54s$_1$) coordinates $\alpha$ and $\beta$, determine its coordinate $\alpha$ is lower than E and, simultaneously, whether coordinate $\beta$ is lower than L; supply on its second output (54s$_2$) a signal (DANS) determining whether the preceding condition is or is not satisfied;

(B$_3$) - a pattern memory circuit (55), constituted by memories containing information defining different types of pattern and, for each type, several patterns, said circuit incorporating a control input (55e$_1$) connected to the first output (54s$_1$) of computing circuit (54) and receiving the relative coordinates ($\alpha,\beta$), a second selection input (55e$_2$) connected to the second output (53s$_2$) of the operation parametrization circuit (53), said input (55e$_2$) receiving selection signals (CHOIX) of one pattern from among several, a third input (55e$_3$) connected to output (10s$_2$) of computer (10) and receiving loading signals, and an output (55s) supplying a signal (V$_M$), which can be written into the image memory for the selected pattern;

(B$_4$) - a configuration selection circuit (56), which has a first input (56e$_1$) connected to the third output (53s$_3$) of the operation parametrization circuit (53) and which receives signals (V$_F$, modes) determining an operating mode, a second input (56e$_2$) connected to the output (55s) of the pattern memory circuit (55) and receiving the signal (V$_M$), a third input (56e$_3$) connected to the second output (54s$_2$) of the computing circuit (54) and receiving the signal (DANS), a fourth input (56e$_4$) connected to the first output (41s$_1$) of the memory cycle transmission circuit (41) and receiving the delayed controlled signal (SC*), said circuit (56) being able, as a function of the signal (DANS) and the signal determining the operating mode, to validate the control cycle (SC*) and determine, as a function of the signal V$_M$ the word with N bits (V) to be written into the image memory, said circuit having a first group of outputs (56s$_1$) connected to the control input (14C) of the image memory and supplying signals controlling the writing into the memory, and a second group of outputs (56s$_2$) connected to the N validation inputs (14V$_1$ ... 14V$_N$) of the image memory and supplying the word (V) to be written into said memory.

2. A graphic terminal according to claim 1, wherein the pattern memory circuit (55) comprises at least one of the three following circuits:

- a point pattern memory circuit (101) incorporating a plurality of N memories (100$_1$ ... 100$_n$), n being an integer at least equal to 1, each memory having an input connected to the second output (10s$_2$) of computer (10) and being able to store a signal (Vp$_1$ ... Vp$_n$) and a multiplexer (102) having n inputs (102e$_1$ ... 102e$_n$), each connected to one of the n memories (100$_1$ ... 100$_n$), a control input (102C) and an output (102s) supplying a signal (Vp);

- a skeleton pattern memory circuit (111), incorporating a memory (110) formed from several memory planes, each plane having a validation input (112), a loading input (113) connected to the second output (10s$_2$) of computer (10) and an addressing input (114) connected to the output (54s$_1$) of circuit (54) and a common output (116), a plurality of n' memories (120$_1$ ... 120$_{n'}$) n' being an integer at least equal to 1, each containing a particular word (VS$_1$ ... VS$_{n'}$), a multiplexer (122) with n' inputs (122e$_1$ ... 122e$_{n'}$), said inputs being in each case connected to one of the memories (120$_1$ ... 120$_{n'}$), with a control input (122C) connected to the output (116) of memory (110) and with an output (122s) supplying a word (V$_S$) characterizing the selected skeleton pattern;

- a true pattern memory circuit 131 incorporating a memory (130) formed from planes, each constituted by a memory point matrix, each plane of said memory (130) having a validation input (132), a loading input (133) connected to the second group of outputs (10s$_2$) of computer (10), an addressing input (134) connected to the output (54s$_1$) of computing circuit (54) and a single output (136) supplying a Vv appropriate for the selected pattern;

- the pattern memory circuit also incorporating: a logic selection circuit (138) having an input (138e) connected to the second output (53s$_2$) of the operation parametrization circuit (53) and receiving a signal determining the choice of a pattern, a first output (138s$_1$) supplying a signal determining a pattern, said output being connected to the control input (102C) of the multiplexer (102) of the point pattern memory circuit (101) as well as to the validation input (112) of one of the memory planes of memory (110) of the skeleton pattern memory circuit (111), as well as to the validation input (132) of one of the memory planes of memory (130) of the true pattern memory circuit (131), and having a second output (138s$_2$) supplying a signal determining the selected pattern type (point pattern, skeleton pattern, true pattern);

- a multiplexer (140) having the same number of inputs (140e$_1$, 140e$_2$, 140e$_3$) as there are pattern memory circuits (101, 111, 131), said inputs being connected to the outputs of these pattern memory circuits, a control input (140C) connected to the second output (138s$_2$) of the logic selection circuit (138) and to an output (140s) supplying a selected word (V$_M$) and constituting the output (55s) of the overall pattern memory circuit, said output being connected to the second input (56e$_2$) of the selection circuit (56).

3. A graphic terminal according to claim 1, wherein the computing circuit (54) using a complement 2 binary arithmetic, directly supplies the coordinates α and β, no matter what the sign of α* and β*, by applying to the complement 2 representation of the values of α* and β*, the following equations:

$$\alpha = \alpha^* \text{ modulo } \Delta X;$$

$$\beta = \beta^* \text{ modulo } \Delta Y,$$

X and Y being the powers of 2.

* * * * *

UNITED STATES PATENT AND TRADEMARK OFFICE
CERTIFICATE OF CORRECTION

PATENT NO. : 4,543,645

DATED : September 24, 1985

INVENTOR(S) : Jean-Pierre Vigarie

It is certified that error appears in the above—identified patent and that said Letters Patent is hereby corrected as shown below:

Column 1, line 10, "contro" should read as "control".

Column 5, line 34, following "of" "a" should read as "a*".

Column 9, line 58, "$\Delta *$" should read as "B*".

Column 10, line 25, "10s" should read as "$10s_2$" and "$10s_1$" should read as "10".

Column 10, line 44, "sign the word" should be omitted and the word "signal" should be inserted.

Column 10, line 44, after "$V_m$", 'the word V" should be inserted.

Column 11, line 26, "50" should be inserted after "part".

Column 11, line 51, "p" should read as "$\pi$".

Column 14, line 8, "122ed'" should read as "$122e_n$".

Column 17, line 29, "I" should read as "L".

Column 18, line 34, "aY" should read as "$\Delta Y$".

UNITED STATES PATENT AND TRADEMARK OFFICE
CERTIFICATE OF CORRECTION

PATENT NO. : 4,543,645
DATED : September 24, 1985
INVENTOR(S) : Jean-Pierre Vigarie It is certified that error appears in the above—identified patent and that said Letters Patent is hereby corrected as shown below:

Column 19, line 27, "pattern$\overline{Q}$/" should read as "$\overline{pattern}$-SQ".

Column 19, lines 27 and 28, "$\overline{pattern}$R/" should read as "$\overline{pattern}$-VR".

Column 21, line 56, "$55_3$" should read as "$55e_3$".

Column 22, in Table VII, "a a a a" should be inserted between columns "$A_2$ and $A_1$" instead of under column "$A_1$".

Column 22, line 20, the number "5" should not be after the letter "3".

Column 26, line 43, claim 2, "havirg" should read as "having".

*NOTE -- PAGE 2 of 2

Signed and Sealed this

Twenty-second Day of April 1986

[SEAL]

Attest:

DONALD J. QUIGG

Attesting Officer      Commissioner of Patents and Trademarks